United States Patent

Inazawa et al.

[11] Patent Number: 6,157,606
[45] Date of Patent: Dec. 5, 2000

[54] RECORDING APPARATUS, REPRODUCING APPARATUS AND OPTICAL RECORDING MEDIUM

[75] Inventors: Yoshizumi Inazawa, Kanagawa; Tadao Suzuki, Tokyo, both of Japan

[73] Assignee: Sony Corporation, Tokyo, Japan

[21] Appl. No.: 09/042,688

[22] Filed: Mar. 17, 1998

[30] Foreign Application Priority Data

Mar. 19, 1997 [JP] Japan ................................ 9-065219

[51] Int. Cl.$^7$ ............................ G11B 7/28; G11B 3/64; H04N 7/167
[52] U.S. Cl. ............................ 369/116; 369/54; 369/58; 369/84; 369/47; 380/201
[58] Field of Search ..................... 369/116, 272, 369/52, 84, 53, 19, 54, 59, 58, 47; 705/57; 360/31, 53; 380/2, 201, 242

[56] References Cited

U.S. PATENT DOCUMENTS

| | | | |
|---|---|---|---|
| 5,406,625 | 4/1995 | Kotaka et al. | 369/53 |
| 5,517,533 | 5/1996 | Szmauz et al. | 375/354 |
| 5,761,301 | 6/1998 | Oshima et al. | 380/4 |
| 5,802,174 | 9/1998 | Sako et al. | 380/201 |
| 5,809,545 | 9/1998 | Ozaki et al. | 711/164 |

FOREIGN PATENT DOCUMENTS

| | | |
|---|---|---|
| 0071980 | 2/1983 | European Pat. Off. . |
| 0126609 | 11/1984 | European Pat. Off. . |

*Primary Examiner*—Tan Dinh
*Assistant Examiner*—Kim-Kwok Chu
*Attorney, Agent, or Firm*—Jay H. Maioli

[57] ABSTRACT

A recording apparatus for modulating a master key used for encrypting main data in a pit-width direction by changing a light amount of a laser beam to then record it on an optical recording medium and records the main data encrypted by using the master key with correcting the main data so as to have a certain pit width and a pit length so that a jitter resulting in intersymbol interference of adjacent pits should be reduced. A reproducing apparatus for reproducing the recorded optical recording medium, and to thereby prevent an optical recording medium from being duplicated by an illegal copy.

20 Claims, 16 Drawing Sheets

RECORDING APPARATUS, REPRODUCING APPARATUS AND OPTICAL RECORDING MEDIUM

BACKGROUND

1. Field of the Invention

The present invention relates to an optical information recording apparatus, an optical information reproducing apparatus and an optical information recording medium and can be applied to e.g., an optical disk for recording a video signal, etc., its recording apparatus and reproducing apparatus.

According to the present invention, timing of the irradiation of a laser beam and a light amount of the laser beam are controlled, and subdata required to process reproduced data obtained by judging a reproduced signal with a threshold value as a reference is recorded by an amplitude value of the reproduced signal with respect to the reproduced data so that an illegal copy can be effectively avoided.

2. Background of the Invention

For example, in a compact disk as a conventionally known optical information recording medium, data to be recorded is subjected to an eight-to-fourteen modulation (EFM) so that a series of pits is formed in a period from 3T to 11T with respect to a predetermined basic period T. Thus, audio data, etc. are recorded.

In a compact disk player for reproducing the above compact disk, a return light is received by irradiating the laser beam onto the compact disk so that a reproduced signal having a signal level changed in accordance with a light amount of this return light is obtained. This reproduced signal is changed to be two-valued at a predetermined slice level so that a binary signal is generated. Further, a PLL circuit is driven by this binary signal so that a reproducing clock is generated. The binary signal is sequentially latched by this reproducing clock so that reproduced data varying in a period from 3T to 11T in response to the pit series formed on the compact disk is generated.

The compact disk player is arranged such that the reproduced data generated in this way is decoded by data processing corresponding to that used at the recording time, and audio data, et. recorded on the compact disk are reproduced.

In a transmission system for transmitting the audio data, etc. through the recording medium of optical information in this way, a copy preventing system as shown in e.g., FIG. 1 or 2 is proposed to effectively avoid an illegal copy.

Specifically, in a copy preventing system 1 shown in FIG. 1, data D1 to be recorded is scramble-processed by a master key KM in an encoder 3 on a disk manufacture side 2 and the scramble-processed data is recorded on an optical disk 5. Further, for example, reproduced data reproduced from the optical disk 5 is descrambled by the master key KM common to the disk manufacture side 2 in a decoder 7 of a reproducing apparatus 6, and the descrambled-processed data is processed by a decoder 8 of a MPEG, etc. Thus, the copy preventing system 1 enciphers the data D1 to be recorded by using the master key KM common to the reproducing side determined in advance so that the illegal copy is prevented.

A copy preventing system 10 shown in FIG. 2 enciphers data D1 by a master key KM, a disk key KD inherent to an optical disk 11, and a title key KT inherent to each of literary work. Namely, a disk manufacture side 12 scramble-processes the disk key KD by the master key KM in an encoder 13 and records this scramble-processed disk key KD on the optical disk 11. Further, in an encoder 14, the title key KT is scramble-processed by the scramble-processed disk key KD and the scramble-processed title key KT is recorded on the optical disk 11.

Further, the disk manufacture side 12 scramble-processes the data D1 to be recorded by the scramble-processed title key KT in an encoder 15, and then records the data on the optical disk 11. Thus, the disk manufacture side 12 scramble-processes the data D1 in multiple with the master key KM as a reference and records the data D1 on the optical disk 11.

In contrast to this, a reproducing apparatus 16 descramble-processes the scramble-processed disk key KD by the master key KM and decodes the disk key KD in a decoder 17. Further, in a decoder 18, the scramble-processed title key KT is descramble-processed by the disk key KD. In a subsequent decoder 19, the data D1 is descramble-processed by this disk key KD.

Thus, the copy preventing system 10 is arranged such that an illegal copy is prevented in consideration of the stands of a disk manufacturer and a maker of literary works.

It is considered that there are two kinds of the illegal copy. One of the illegal copies is made by a method in which the master key, is decrypted and an optical disk is manufactured such that the optical disk can be reproduced by the reproducing apparatus on the basis of results of the decryption even when the optical disk is a pirated disk. The remaining illegal copy is made by a method for physically copying a pit shape formed on a normal optical disk.

In the copy preventing system using the master key, it is possible to cope with the former illegal action by making the decryption of the master key, difficult. However, when the master key is once decrypted, there is a defect in that no pirated disk can be excluded. It is also impossible to cope with the latter illegal copy.

SUMMARY OF THE INVENTION

In view of such aspects, it is an object of the present invention to provide an optical information recording apparatus, an optical information reproducing apparatus and an optical information recording medium which can effectively avoid an illegal copy.

A recording apparatus for recording run length limited encoded data on an optical recording medium, includes an edge change detector for detecting a change pattern of an edge of the run length limited encoded data, a timing calibrator for correcting a timing of the run length limited encoded data so that a produced jitter resulting from intersymbol interference upon reproduction should be reduced depending upon the change pattern of the edge detected by the edge change detector, and a light amount controller for controlling a light amount of a light beam being irradiated on the optical recording medium based on a timing output from the timing calibrator, wherein when key data used for encrypting main data recorded on the optical recording medium is recorded on the optical recording medium, the light amount controller is controlled based on the key data.

A reproducing apparatus for reproducing an optical recording disk recorded by the above recording apparatus and for reproducing an optical recording medium where main data to be recorded after being encrypted is recorded at a first reproduction signal level and key data used for decrypting the main data is recorded at a second reproduction signal level different from the first reproduction level includes a binarization converter for binarizing a reproduction signal reproduced from the optical recording medium with an inherent slice level, a key detector for detecting key data from the reproduction signal, a demodulator for demodulating the binarized reproduction signal, and a decoder for decrypting the reproduction signal demodulated by the demodulator by using the key data detected by the key detector to thereby decode it.

An optical recording medium which is recorded by the above recording apparatus and in which a run length limited coded data is recorded at a reference period in the form of a mark or space form, includes encryption data represented by a width of the mark or the space, and main data encrypted by using the encryption data represented by a length and an interval of the mark or the space.

DESCRIPTION OF THE PREFERRED EMBODIMENTS

The embodiments of the present invention will hereinafter be described in detail with reference to the accompanying drawings.

Figure 3:
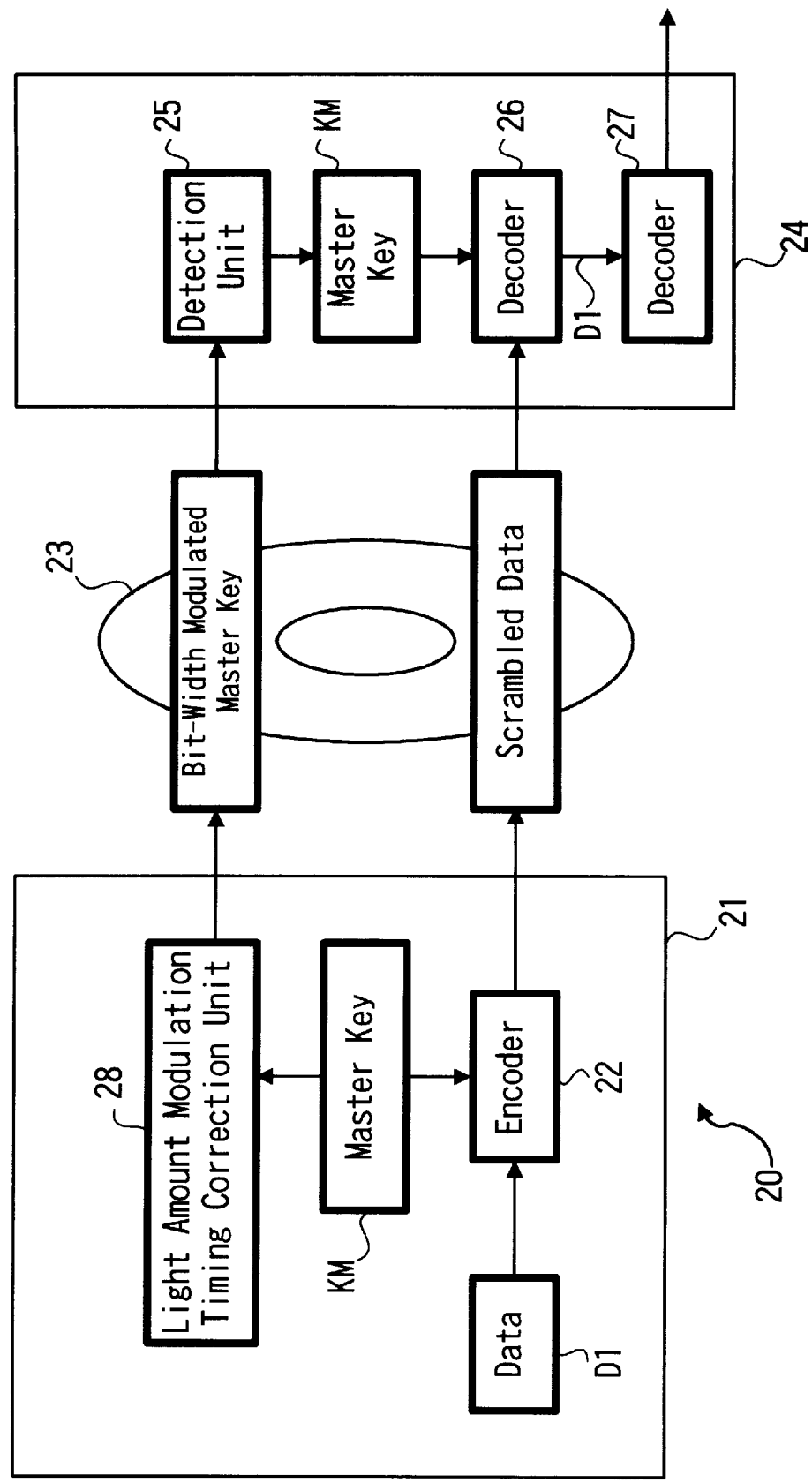
FIG. 3 is a block diagram showing an information transmitting path in an optical disk according to a first embodiment of the present invention.

FIG. 3 is a block diagram showing an information transmitting path 20 in accordance with a first embodiment of the present invention. In this information transmitting path 20, an encoder 22 on a disk manufacture side 21 scrambles, by using a master key KM, data D1 to be transmitted and then records the scrambled data on an optical disk 23. At this time, the scrambled data is recorded at a pit length and a pit interval of the optical disk 23 on the disk manufacture side 21. The data D1 to be transmitted is video data and audio data compressed in accordance with a moving picture expert group (MPEG) format. Alternatively, the data D1 may be audio data converted into a one-bit digital signal by $\Sigma\Delta$ modulation.

Further, a light amount modulation timing correcting unit 28 intermittently changes the light amount of a laser beam irradiated on the optical disk 23 by a light amount modulation with reference to the master key KM on the disk manufacture side 21 so that a pit width is modulated and the master key KM is recorded. Further, at this time, an edge position of the pit changed by the light amount modulation is corrected in a pit length direction by correcting a timing of the irradiation of the laser beam on the disk manufacture side 21 so that the recorded data can be reliably reproduced.

The master key KM is correspondingly demodulated on the side of a reproducing apparatus 24 by detecting the amplitude of a reproduced signal by a detecting section 25. In a decoder 26, reproduced data is descramble-processed by the master key KM. Thereafter, in the reproducing apparatus 24, the descramble-processed data D1 is processed by a decoder 27.

Figure 4:
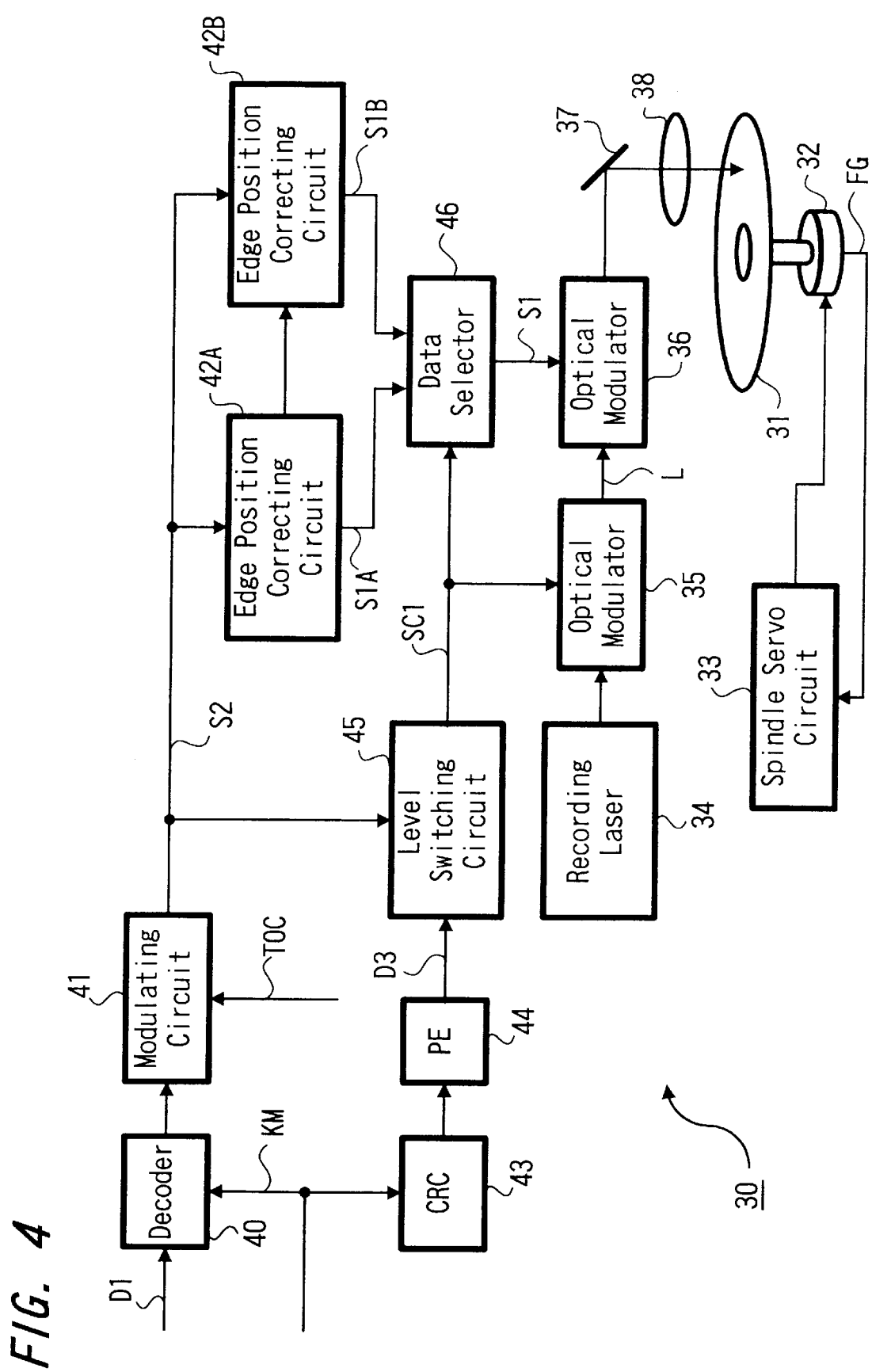
FIG. 4 is a block diagram showing an optical disk apparatus 30 used on a disk manufacture side of FIG. 3.

FIG. 4 is a block diagram showing an optical disk recording apparatus 30 used on this disk manufacture side 21. A disk original 31 is exposed by this optical disk recording apparatus 30 on the disk manufacture side 21 and the data D1 of the MPEG format is recorded. After this disk original 31 is developed, a mother disk is made by electroforming processing on the manufacture side 21 of the optical disk and a stamper is made by this mother disk. Further, a disk-shaped substrate is made by the stamper made in this way on the manufacture side 21 of the optical disk, and a reflecting film and a protecting film are formed on this disk-shaped substrate so that an optical disk is made.

Namely, in this optical disk recording apparatus 30, a spindle motor 32 rotates the disk original 31 and outputs an FG signal FG which has a signal level rising at every predetermined rotating angle, from an FG signal generator held in a bottom portion thereof. A spindle servo circuit 33 drives the spindle motor 32 in accordance with an exposure position of the disk original 31 such that the FG signal FG has a predetermined frequency. Thus, the disk original 31 is rotated in the condition at a constant linear velocity.

A laser 34 for recording is constructed by a gas laser, etc. and emits a laser beam L for exposing the disk original board 31. An optical modulator 35 is constructed by an electroacoustic optical element, and switches a light amount of the laser beam L in accordance with a control signal SC1 and outputs this light amount. Thus, the optical modulator 35 modulates the light amount of the laser beam L in accordance with the control signal SC1.

An optical modulator 36 is constructed by an electroacoustic optical element and on-off-controls this laser beam L by a modulating signal S1 and emits this laser beam L. A mirror 37 bends an optical path of this laser beam L and emits the laser beam toward the disk original board 31. An objective lens 38 converges the reflected light on the mirror 37 to the disk original board 31. The mirror 37 and the objective lens 38 are sequentially moved by an unillustrated sled mechanism in an outer circumferential direction of the disk original board 31 in synchronization with the rotation of the disk original board 31. Thus, an exposure position of the laser beam L is sequentially displaced in the outer circumferential direction of the disk original 31.

Accordingly, in the optical disk recording apparatus 30, a track is formed on the disk original board 31 in a spiral shape by moving the mirror 37 and the objective lens 38 in a state in which the disk original 31 is being rotated. A pit is sequentially formed on this track in accordance with the modulating signal S1. Further, at this time, a pit width is changed in accordance with the control signal SC1.

In a decoder 40, data of the master key KM is set by an unillustrated controller and the data D1 to be recorded is sequentially scramble-processed with the data of the master key KM as a reference and output. While the laser beam is irradiated on an area corresponding to a read-in area of the optical disk by a modulating circuit 41, it run-length-limited (RLL) encodes a data series of a table of content (TOC), etc. output from the controller and outputs the data series. Further, subsequently to the data series of this TOC, etc., while the laser beam is irradiated on an area corresponding to a user area of the optical disk, the modulating circuit 41 modulates scramble data output from the decoder 40 and outputs the scramble data.

The modulating circuit 41 adds an error correcting code to this data in accordance with a predetermined data processing format and then interleave-processes this data. Further, the data series processed in this way is converted to a serial data series, and outputs a modulating signal S2 having a signal level changed in a period integer times a basic period T in accordance with a bit arrangement of the serial data series.

Edge position correcting circuits 42A and 42B detect a changing pattern of the modulating signal S2 and correct timing of the modulating signal S2 so as to reduce the interference between codes at a reproduction time in accordance with this changing pattern. The edge position correcting circuits 42A and 42B then output modulation signals S1A and S1B as corrected results of this timing. At this time, the edge position correcting circuit 42A outputs the modulating signal S1A corresponding to the laser beam at a high level (a light amount of 100 [%]) output from the optical modulator 35. In contrast to this, the edge position correcting circuit 42B outputs the modulating signal S1B corresponding to the laser beam at a low level (a light amount of 85 [%]) output from the optical modulator 35.

A CRC circuit 43 adds an error correcting code to the data KM of the master key and outputs the data. At this time, the CRC circuit 43 outputs the data KM of the master key and the error correcting code in a period (several hundred to several thousand pit periods) sufficiently longer than a pit forming period. Further, the CRC circuit 43 outputs the data KM of the master key and the error correcting code by a sequential circulating repetition.

A phase encoding modulating circuit (PE) 44 PE-modulates (phase-encode modulates) the output data of the CRC circuit 43 and outputs the output data as a serial data series. While the laser beam is irradiated on an area corresponding to the read-in area, a level switching circuit 45 switches and controls a signal level of the control signal SC1 in accordance with output data D3 of the PE modulating circuit 44. In contrast to this, in the other areas, the level switching circuit 45 holds the signal level of the control signal SC1 at a constant value so as to hold the light amount of the laser beam L at a high level.

Thus, the level switching circuit 45 modulates the light amount of the laser beam L in accordance with the master key KM and modulates a pit width formed on the disk original 31 by this modulation of the light amount. Thereafter, the key data KM is recorded by the pit width in the optical disk recording apparatus 30.

A data selector 46 selectively outputs the modulating signals S1A and S1B output from the edge position correcting circuits 42A and 42B to the optical modulator 36 in accordance with the control signal SC1. Thus, in the period in which the light amount of the laser beam L is set to a low level by the level switching circuit 45, the data selector 46 switches a signal to the modulating signal S1B output from the edge position correcting circuit 42B from the modulating signal S1A output from the edge position correcting circuit 42A to the optical modulator 36, then outputting the signal S1B. Thereby, in the optical disk recording apparatus 30, a change in pit length caused by modulating the pit width is corrected by switching the modulating signals S1A and S1B.

Figure 5:
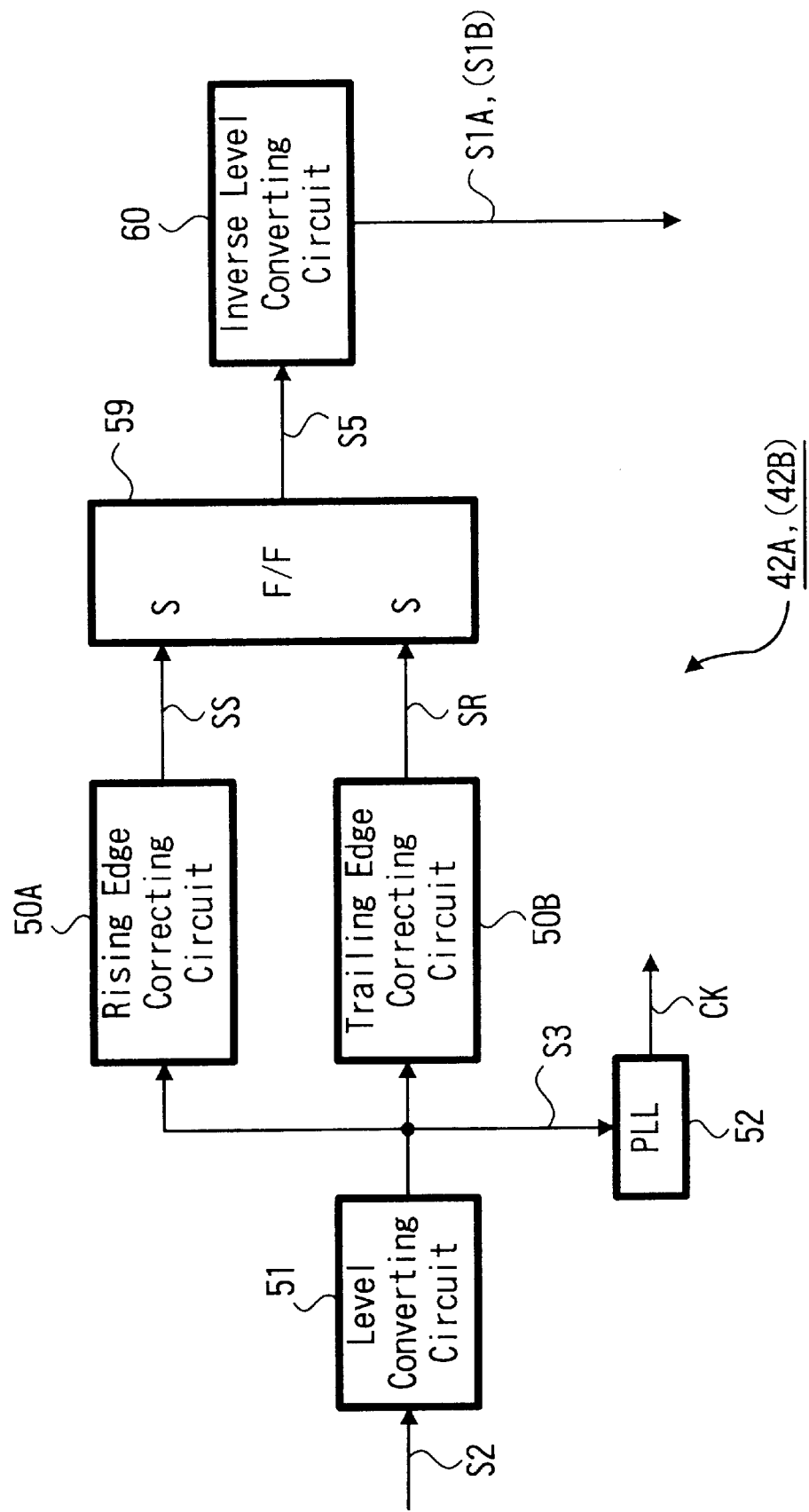
FIG. 5 is a block diagram showing an edge position correcting circuit of the optical disk apparatus 30 shown in FIG. 4.

FIG. 5 is a block diagram showing the edge position correcting circuit 42A. The edge position correcting circuit 42B is the same as the edge position correcting circuit 42A except that correcting data stored in rising edge correcting circuits 50A and 50B are different from each other. Accordingly, an overlapping explanation of the edge position correcting circuit is omitted in the following description.

Figure 6:
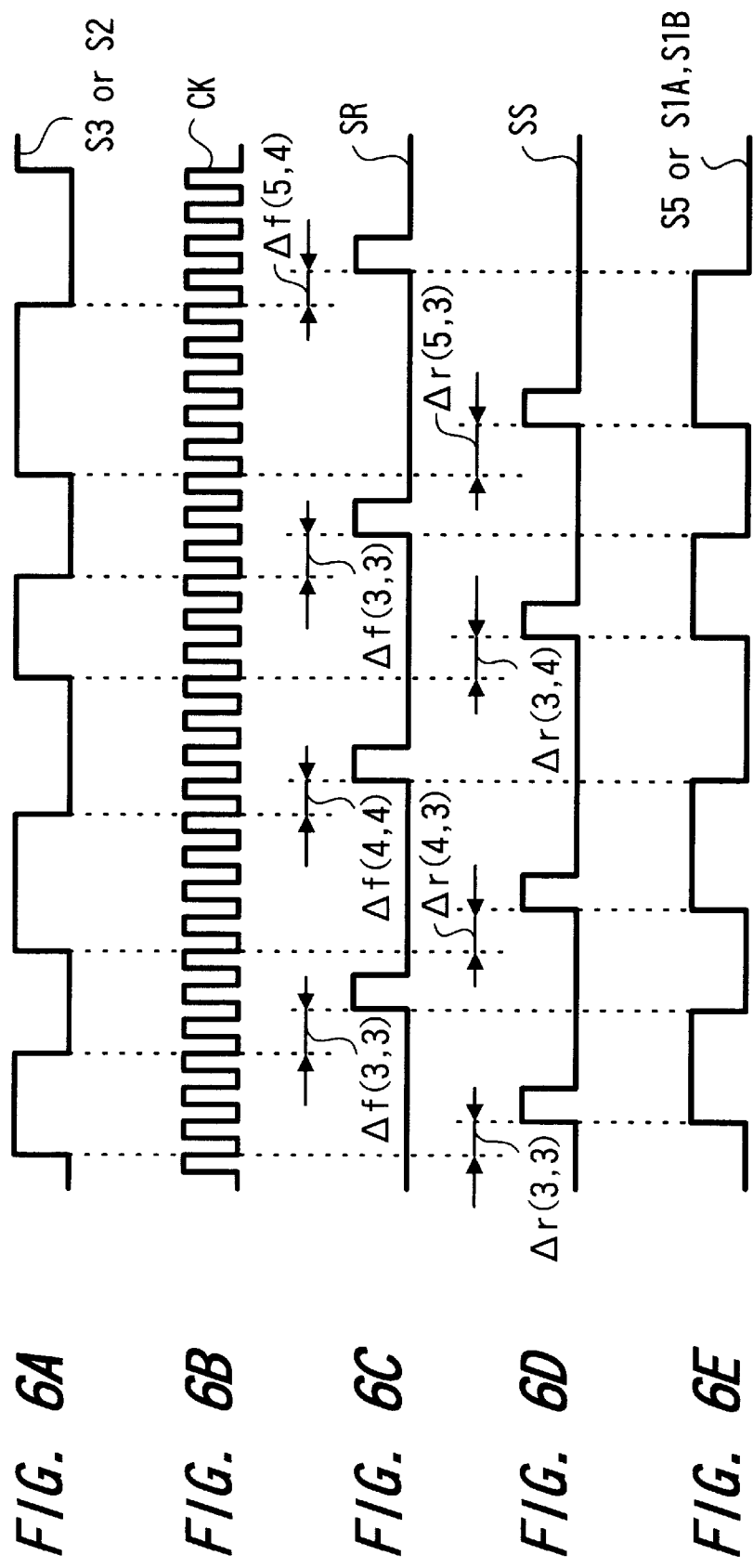
FIG. 6A is a timing chart showing a modulation signal S2 output from a modulating circuit 41.
FIG. 6B is a timing chart showing a clock signal CK.
FIG. 6C is a timing chart showing an SR signal output from a falling edge correcting circuit 50B shown in FIG. 5.
FIG. 6D is a timing chart showing an SS signal output from a rising edge correcting circuit 50A shown in FIG. 5.
FIG. 6E is a timing chart showing signals S1A and S1B output from a level conversion circuit.

In the edge position correcting circuit 42A, a level converting circuit 51 corrects the signal level of the modulating signal S2 to a transistor-transistor logic (TTL) level having an output amplitude of 5 [V] and outputs the corrected modulating signal. As shown in FIGS. 6A and 6B, a phase lock loop (PLL) circuit 52 generates a clock CK (FIG. 6B) from a modulating signal S3 (FIG. 6A) output from the level converting circuit 51 and outputs the clock. The level of the modulating signal S2 is changed in a period that is an integer multiple of a basic period T so that the PLL circuit 52 generates the clock CK at a signal level changed in the basic period T in synchronization with this modulating signal S2.

Figure 7:
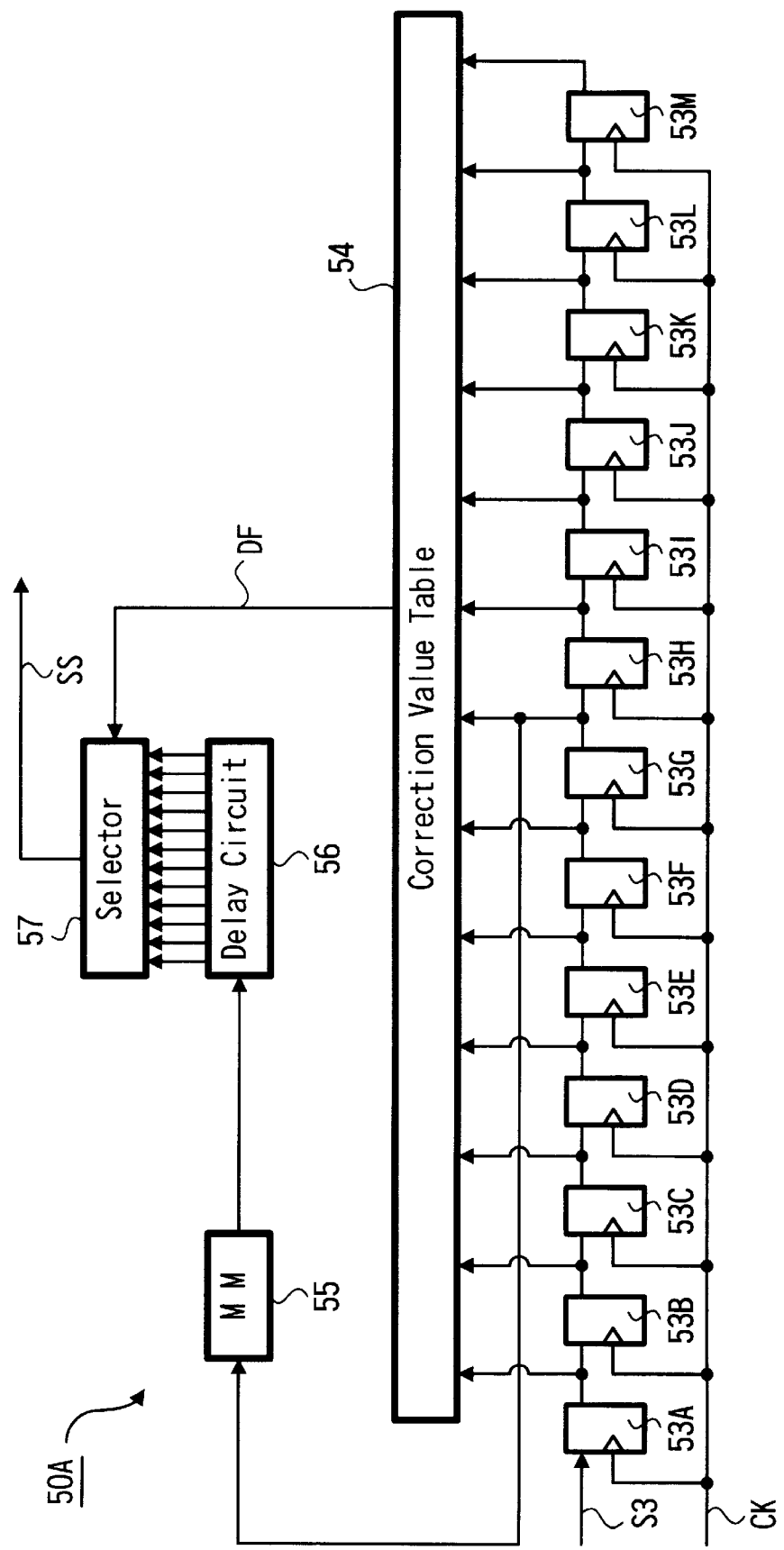
FIG. 7 is a block diagram showing in detail the rising edge correcting circuit 50A or the falling edge correcting circuit 50B shown in FIG. 5.

As shown in FIG. 7, thirteen latch circuits 53A to 53M operated by the clock CK are connected in series to each other in the rising edge correcting circuit 50A and the output signal S3 of the level converting circuit 51 is input to this series circuit. Thus, the rising edge correcting circuit 50A samples the output signal S3 of the level converting circuit 51 at the timing of the clock CK and detects a changing pattern of the modulating signal S2 from sampling results at thirteen continuous points. Namely, for example, when a latch output of "0001111000001" is obtained, this latch output can be judged as a changing pattern in which a pit of a length 4T is continued after a space of a length 5T. Similarly, when a latch output of "0011111000001" is obtained, this latch output can be judged as a changing pattern in which a pit of a length 5T is continued after a space of a length 5T.

A correcting value table 54 is formed by a read only memory which stores a plurality of correcting data. Latch outputs of the latch circuits 53A to 53M are set to addresses and correcting value data DF corresponding to a changing pattern of the modulating signal S3 is output. A monostable multivibrator (MM) 55 inputs a latch output from the central latch circuit 53G among the thirteen latch circuits connected in series, and outputs a rising pulse signal having a signal level rising for a predetermined period (a period sufficiently shorter than a period 3T) with the rising timing of this latch output as a reference.

A delay circuit 56 has tap outputs at twelve stages and the difference in delay time between the respective taps is set to the desired resolution of the timing correction of the modulating signal in the edge position correcting circuit 42A. The delay circuit 56 sequentially delays the rising pulse signal output from the monostable multivibrator 55 and outputs the rising pulse signal from each of the taps. A selector selectively outputs the tap output of the delay circuit 56 in accordance with correcting value data DF. Thus, the selector 57 selectively outputs a rising pulse signal SS (FIG. 6D) having a delay time changed in accordance with the correcting value data DF.

Thus, the rising edge correcting circuit 50A generates the rising edge signal SS which has a signal level rising in accordance with the rising of a signal level of the modulating signal S3 and also has delay times $\Delta r(3, 3)$, $\Delta r(4, 3)$, $\Delta r(3, 4)$, $\Delta r(5, 3)$, ... at respective rising edges of the modulating signal S3 changed in accordance with the changing pattern of the modulating signal S3.

In FIGS. 6C and 6D, the changing pattern of the modulating signal S3 is shown at a pit interval b and a pit length p with one period of the clock CK as a unit. The delay times relative to the rising edges are shown by $\Delta r(p, b)$. Accordingly, in this FIG. 6D, a secondly described delay time $\Delta r(4, 3)$ is a delay time provided when there is a blank of three clocks prior to a pit having a length of four clocks. Thus, the correcting value data DF corresponding to all combinations of these p and b are stored in the correcting value table 54.

As a result, since a pit is formed by irradiating the laser beam L to the optical disk in accordance with the modulating signal S3, the rising edge correcting circuit 50A detects a pit pattern formed on the optical disk in the range of a period 12T with the basic period T as a unit, and generates the rising edge signal SS in accordance with this pattern.

The construction of the falling edge correcting circuit 50B is the same as that of the rising edge correcting circuit 50A except that the monostable multivibrator 55 is operated with the falling edge of the latch output as a reference and contents of the correcting value table 54 are different.

The falling edge correcting circuit 50B generates a falling edge signal SR (FIG. 6C) which has a signal level rising in accordance with the falling of the signal level of the modulating signal S2 and also has delay times $\Delta f(3, 3)$, $\Delta f(4, 4)$, $\Delta f(3, 3)$, $\Delta f(5, 4)$, ... at respective rising edges of the modulating signal S2 changed in accordance with the changing pattern of the modulating signal S2. In the FIG. 6C, similar to the delay times at the rising edges, the delay times at the falling edges are shown by $\Delta f(p, b)$ using the pit length p and the pit interval b.

The falling edge correcting circuit 50B detects a pit pattern formed on the optical disk in the range of a period 12T with the basic period T as a unit, and generates a falling edge signal SR by correcting the timing of the modulating signal S2 at its falling edge as timing of irradiating completion of the laser beam in accordance with this pattern.

In FIG. 5, a flip flop (F/F) 59 synthesizes the rising edge signal SS and the falling edge signal SR and outputs a synthesized signal. Specifically, the flip flop 59 is input with the rising edge signal SS and the falling edge signal SR to a set terminal S and a reset terminal R, respectively. Thus, as shown in FIG. 6E, it generates a modulation signal S5 which, after the signal level thereof rises at the rising of the signal level of the rising edge signal SS, the signal level of the modulating signal falls at the rising of the signal level of the falling edge signal SR. The flip flop 59 generates this modulating signal S5. A level inverse converting circuit 60 corrects the signal level of this modulating signal having an output amplitude at a TTL level and outputs the modulating signal having an original output amplitude.

Timings of the modulating signal S2 at the raising and falling edges are corrected in accordance with the front and rear pits and a land length, and this corrected modulating signal is output. Irradiating timing of the laser beam L on the disk original 31 is correspondingly corrected in accordance with the front and rear pits and the land length.

Thus, in the optical disk recording apparatus 30, the positions of the front and rear edges of each of the pits are corrected such that jitters caused by the interference between codes at a regenerating time are reduced. Further, the edge position correcting circuits 42A and 42B corresponding to the light amount of the laser beam L for recording correct the positions of the front and rear edges of each of the pits so as to discriminate a reproduced signal at a constant threshold value and reliably reproduce data D1 recorded by the pit length and the pit interval even when the light amount of the laser beam L is reduced.

Figure 8:
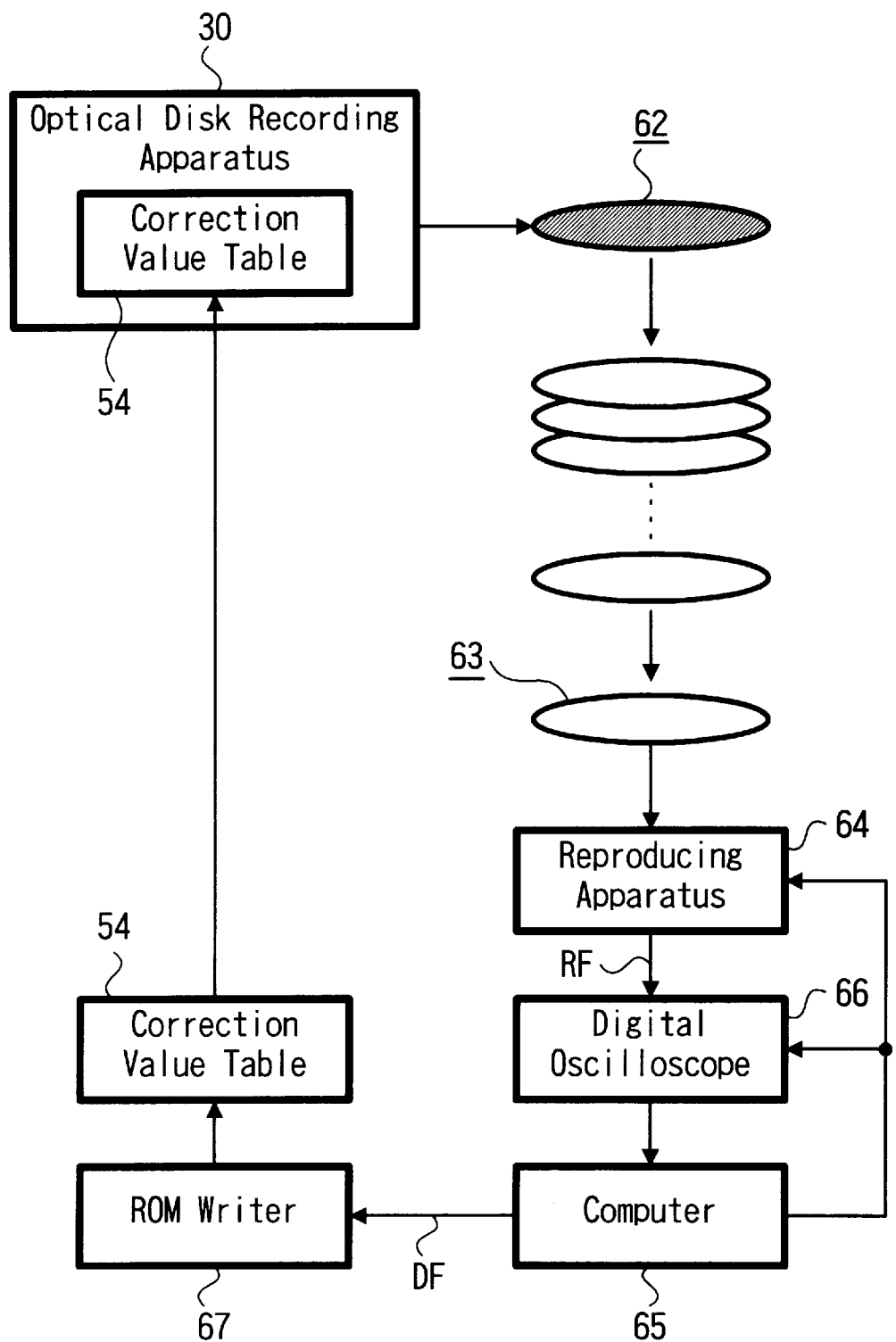
FIG. 8 is a diagram showing a processing for making a correction value table.

FIG. 8 is a process view used to explain generation of the correcting value table 54 used to make the timing correction at the edges in this way. In the optical disk recording apparatus 30, the reproduced signal crosses a predetermined slice level in correct timing synchronized with the clock CK by suitably setting the correcting value table 54 even when the pit length and front and rear blank lengths are changed.

The correcting value table 54 is set in the rising edge correcting circuit 50A and the falling edge correcting circuit 50B in each of the edge position correcting circuits 42A and 42B. However, the correcting value table is generated by the same generating method except that generating conditions are different from each other. Accordingly, the rising edge correcting circuit 50A will be explained here.

In this process, a disk original for evaluation is made by the optical disk recording apparatus 30 and the correcting value table is set on the basis of the reproduced results of an optical disk made by this disk original.

Here, the correcting value table 54 for an evaluating reference is set in the optical disk recording apparatus 30 upon a making time of this disk original board for evaluation. This correcting value table 54 for an evaluating reference is formed by setting the correcting value data DF so as to selectively output a center tap output of the delay circuit 56 at any time in the selector 57 shown in FIG. 7. Thus, in this process, the disk original 31 is exposed by the same condition as a case in which the optical modulator 36 is directly operated by a modulating signal S3, that is the disk original is exposed by the same condition as a normal optical disk making process.

In this process, the disk original 31 exposed in this way is developed and is then electroforming-processed so that a mother disk is made. A stamper 62 is made from this mother disk. Further, similar to the normal optical disk making process, an optical disk 63 is made from this stamper 62.

Figure 9:
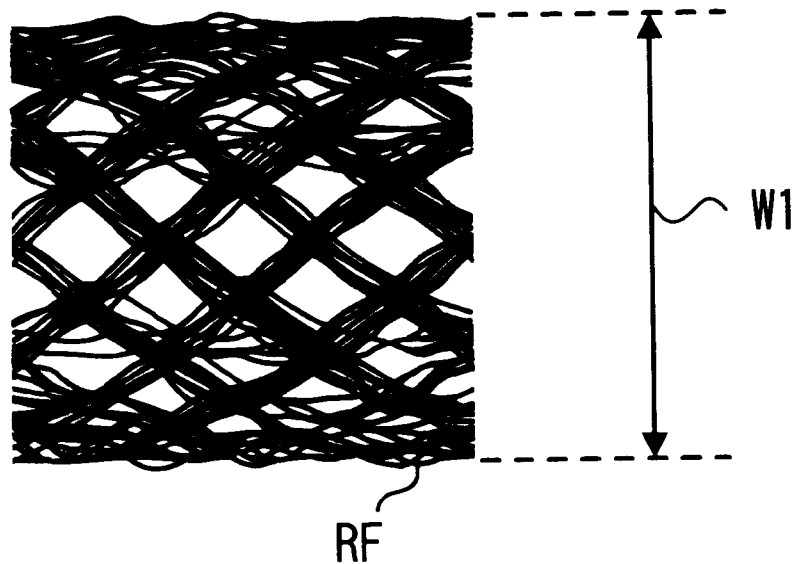
FIG. 9 is a diagram showing a waveform of an RF signal obtained when a light amount of a laser beam is 100%.
Figure 10:
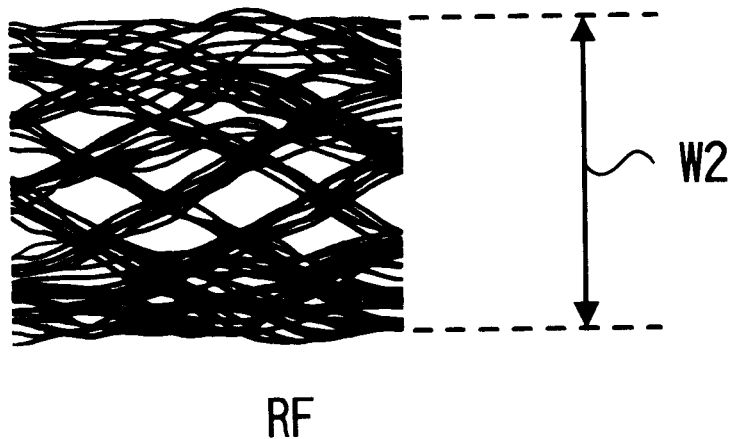
FIG. 10 is a diagram showing a waveform of an RF signal obtained when a light amount of a laser beam is 85%.

A reproducing apparatus 64 reproduces the optical disk 63 for evaluation made in this way. At this time, an operation of the reproducing apparatus 64 is controlled by a computer 65 and is switched so that a reproduced signal RF having a signal level changed in accordance with the amount of return light obtained from the optical disk 63 is output to a digital oscilloscope 66 from a built-in signal processing circuit. A pit width of this optical disk 63 is changed as the light amount of the laser beam L is switched. Accordingly, when the reproduced signal RF is observed by the digital oscilloscope 66, it is observed that an amplitude of the reproduced signal is changed in a portion corresponding to the pit. FIGS. 9 and 10 respectively show signal wave forms of the reproduced signals RF when the light amount of the laser beam is irradiated at high and low levels. As can be seen therefrom, the signal amplitude is increased from W2 to W1 in accordance with the light amount of the laser beam.

The front and rear edges of a pit with respect to the reproduced signal RF are changed as the pit width is changed. Accordingly, a large jitter is observed and asymmetry is greatly changed as the amplitude is changed. Further, jitters caused by the interference between codes from front and rear pits are also observed in pit portions formed by using the laser beam at a high light intensity level such as a user area, etc.

An operation of the digital oscilloscope 66 is controlled by the computer 65 and is switched so that analog digital converting processing of this reproduced signal RF is performed at a sampling frequency 20 times that of a channel clock. As a result, the digital oscilloscope outputs the obtained digital signal to the computer 65.

The computer 65 controls the operation of the digital oscilloscope 66 and also processes the digital signal output from the digital oscilloscope 66 so that the computer sequentially calculates correcting value data DF. Further, the computer 65 operates a ROM writer 67 so that the calculated correcting value data DF is sequentially stored in the read only memory. Thus, the correcting value table 54 is formed. In this process, the optical disk is finally manufactured by this correcting value table 54.

Figure 11:
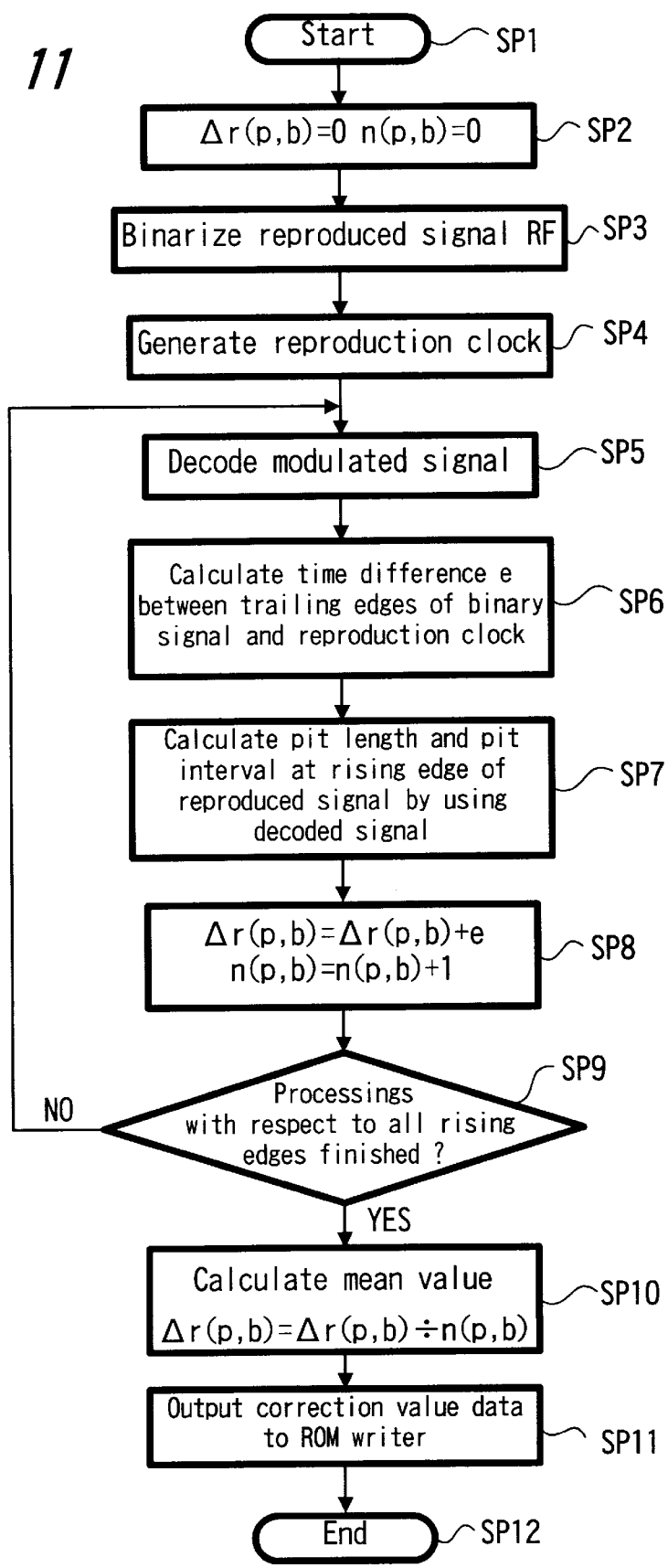
FIG. 11 is a flowchart showing a processing of a computer 65 shown in FIG. 8.

FIG. 11 is a flow chart showing a processing procedure in this computer 65. In this processing procedure, the computer 65 initializes a jitter detection result Δr(p, b) and the number n(p, b) of jitter measurement times to value 0 in a step SP2 from a step SP1. Here, the computer 65 calculates the jitter detecting result Δr(p, b) and counts the number n(p, b) of jitter measuring times at every combination of the pit length p and the pit interval b with respect to front and rear edges as jitter detecting objects. Therefore, the computer 65 sets all of the jitter detecting result Δr(p, b) and the number n(p, b) of jitter measuring times to initial values in the step SP2.

Subsequently, in the next step SP3, the computer 65 compares the voltage level of a digital signal output from the digital oscilloscope 66 with a predetermined slice level, and generates a digital binary signal by setting the reproduced signal RF to be two-valued. In this processing, the computer 65 sets the digital signal to be two-valued such that a level equal to or greater than the slice level shows value 1 and a level smaller than the slice level shows value 0.

Subsequently, the computer 65 proceeds to a step SP 4 and generates a reproduced clock from the binary signal formed of this digital signal in the step. Here, the computer 65 simulates the operation of the PLL circuit by arithmetic processing with the binary signal as a reference and generates the reproduced clock by this simulation.

Further, in a subsequent step SP5, the computer 65 samples the binary signal at the timing of such a generated reproduced clock at each falling edge thereof so that a modulated signal is decoded (hereinafter, this decoded modulating signal is called a decoded signal).

Subsequently, the computer 65 proceeds to step SP6 and detects a time difference e from the time point of a rising edge of the binary signal to a falling time point of the reproduced clock most proximate to this rising edge. Thus, the computer time-measures jitters at this edge. Subsequently, in a step SP7, the computer 65 detects front and rear pit lengths p and pit intervals b from the decoded signal with respect to the edge time-measured in the step SP6.

Subsequently, in a step SP8, the computer 65 adds the time difference e detected in the step SP6 to the jitter detecting result Δr(p, b) corresponding to the front and rear pit lengths p and pit intervals b, and increments the corresponding number n(p, b) of jitter measuring times by value 1. Subsequently, the computer 65 proceeds to a step SP9 and judges whether the time measurement is completed or not with respect to all rising edges. When a negative result is obtained here, it is returned to the step SP5.

Thus, the computer 65 repeats a processing procedure of steps SP5, SP6, SP7, SP8, SP9 and SP5 in this order and accumulatively adds the time-measured jitter detecting result at every changing pattern appearing at the reproduced signal RF, and counts the number of additions. This changing pattern is classified in a period of front and rear six samples (a period 12T as a whole) from a jitter detecting object edge with the basic period T as a reference in accordance with the number of stages of the latch circuits 53A to 53M in the rising edge correcting circuit 50A.

Thus, when the jitter time measurement is completed with respect to all the edges, the computer 65 obtains a positive result in the step SP9 and hence it proceeds to a step SP10. Here, an average value of the time-measured jitter detecting result is calculated at every changing pattern appearing at the reproduced signal RF. Namely, since the jitter detected in the step SP6 is influenced by noises, the computer 65 calculates the average value of the jitter detecting result in this way and improves a measuring accuracy of the jitter.

When the computer 65 calculates the average value of the jitter detecting result in this way, it subsequently proceeds to a step SP11. In this step, the computer generates correcting value data DF from this detecting result at every changing pattern, and outputs each correcting value data DF to the ROM writer 67. Here, the correcting value data DF is calculated by executing arithmetic processing in the following equation (1) when the difference in delay time between taps in the delay circuit 56 is set to τ.

$$Hr1(p, b) = \frac{-a\Delta r(p, b)}{\tau} + Hr0(p, b) \quad (1)$$

Here, Hr1(p, b) represents a tap of the delay circuit 56 selected by the correcting value data DF and represents a center tap in the case of value 0. Also Hr0(p, b) represents a tap of the delay circuit 56 selected by the correcting value data DF as an initial value and Hr0(p, b) is set to value 0 in this embodiment. Further, a represents a constant. Here, in this embodiment, a is set to a value (e.g., 0.7, etc.) equal to or smaller than one so that the correcting value data can be reliably converged even when there are influences such as noises, etc.

The computer 65 generates the correcting value data so as to set the reproduced signal RF to be two-valued at a normal slice level and generate the binary signal in correct timing even when the light amount of the laser beam L is fallen with the signal level of the reproduced signal RF detected through the digital oscilloscope 66 as a reference and is fallen by executing generating processing of the above correcting value data in the case of the normal light amount.

When the computer 65 stores the correcting value data DF generated in this way in the ROM writer 67, it proceeds to a step SP12 and this processing procedure is terminated. Subsequently, the computer 65 executes a similar processing procedure with respect to a falling edge of the digital binary signal so that a correcting value table 54 is completed.

Figure 12:
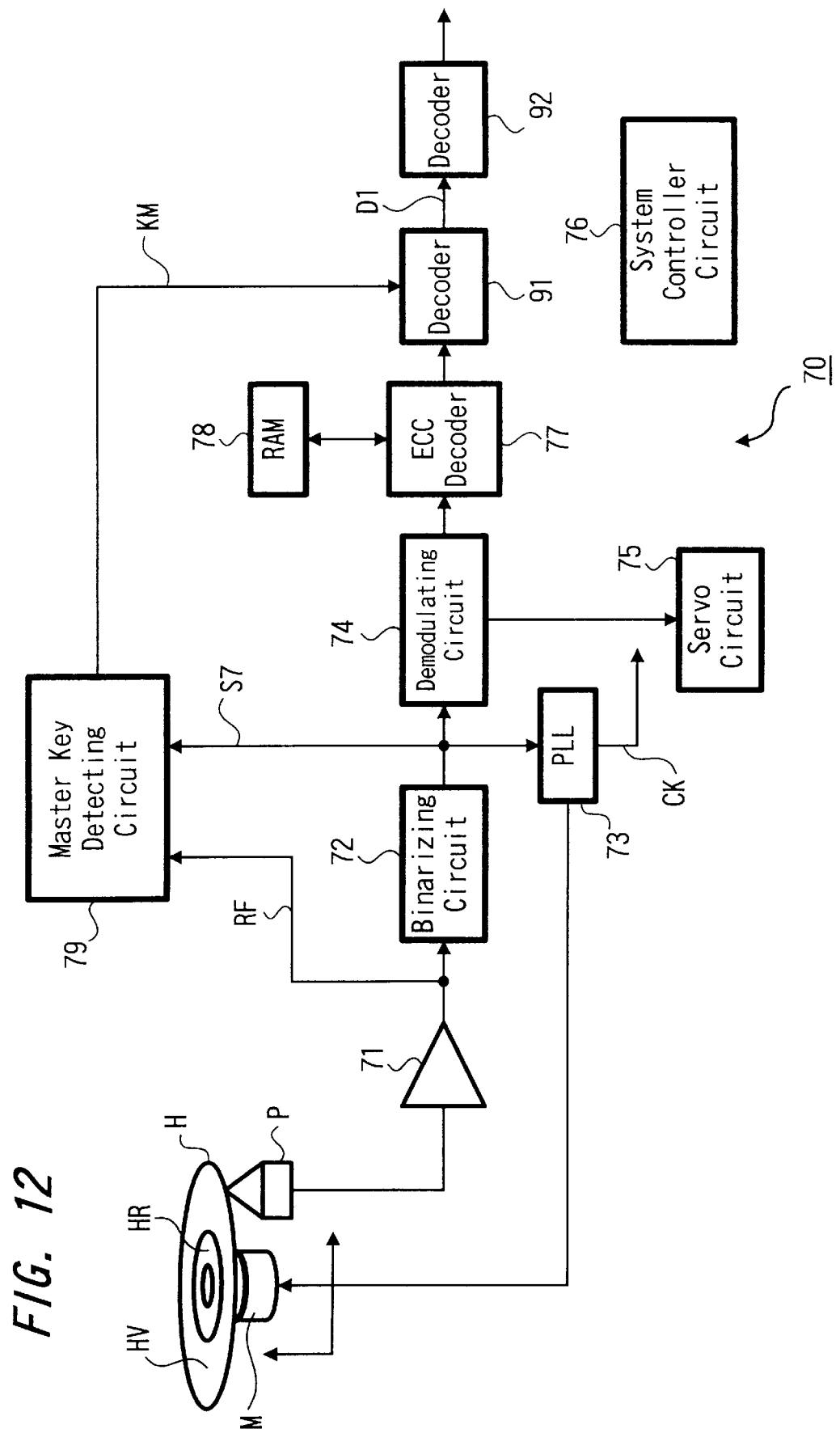
FIG. 12 is a block diagram of a reproducing apparatus 70.

FIG. 12 is a block diagram showing a reproducing apparatus of the optical disk manufactured in this way. In this reproducing apparatus 70 an optical disk H is rotated by a spindle motor M and a laser beam having 780 [nm] in wavelength is irradiated by an optical pickup P under this rotating state. Further, in the reproducing apparatus 70, a return light of this laser beam is received by the optical pickup P and a reproduced signal RF having a signal level changed in accordance with an amount of this return light is generated.

An amplifying circuit 71 amplifies this reproduced signal RF and then outputs the reproduced signal by equalizing a waveform of this reproduced signal. A binary circuit 72 receives the reproduced signal RF output from this amplifying circuit 71 and discriminates the signal level of the reproduced signal RF at a predetermined threshold value and outputs a binary signal S7. A PLL circuit 73 generates a reproducing clock (channel clock) CK with this binary signal S7 as a reference and outputs this reproducing clock.

The reproduced signal RF is reproduced by an extremely small jitter by correcting the irradiating timing of the laser beam in accordance with forming patterns of various kinds of pits and correcting the timings of front and rear edges of each pit on an optical disk manufacture side. Further, in a read-in area HR, a signal amplitude is intermittently increased by intermittently reducing the light amount of the laser beam and modulating a pit width. Further, the irradiating timing of the laser beam is corrected in accordance with this increase in the light amount of the laser beam. Thus, the timings of the front and rear edges of each pit are also corrected in a portion in which the light amount of the laser beam is reduced. Accordingly, the reproduced signal is reproduced with the same asymmetry as other portions.

The binary circuit 72 generates the binary signal S7 in correct timing corresponding to the basic period T at a recording time. Further, the PLL circuit 73 generates the reproducing clock CK having an extremely small jitter and outputs this reproducing clock.

A demodulating circuit 74 generates reproduced data by sequentially latching the binary signal with the reproduced clock CK as a reference. Further, the demodulating circuit 74 demodulates the reproduced data and outputs the demodulated reproduced data. A servo circuit 75 detects the address of a laser beam irradiating position from the reproduced data and makes the optical pickup P seek on the basis of this address detecting result. The servo circuit 75 controls an operation of the spindle motor M with the clock CK as a reference so that the optical disk H is rotated in the condition of a constant linear velocity. Further, the operation of a predetermined seek mechanism is controlled by the control of a system control circuit 76 so that the optical pickup P is sought.

An ECC decoder 77 latches the reproduced data output from the demodulating circuit 74 and holds the reproduced data in a random access memory (RAM) 78. Thereafter, the ECC decoder reads the reproduced data in a predetermined order so that the reproduced data is deinterleave-processed. Further, the ECC decoder 77 performs error correcting processing of this reproduced data and outputs this processed data.

Figure 13:
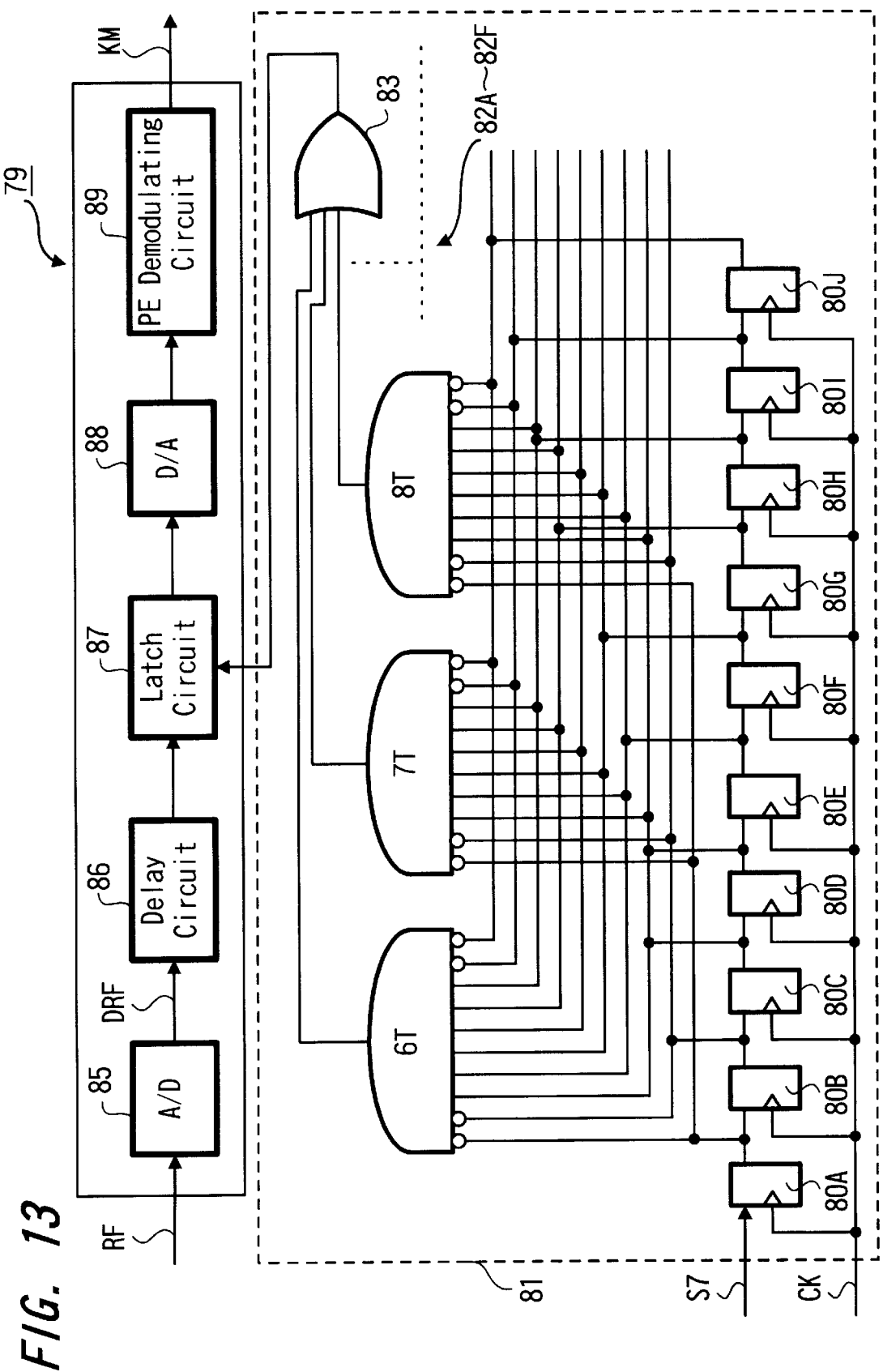
FIG. 13 is a block diagram showing in detail a master key detecting circuit 79 shown in FIG. 12.

A master key detecting circuit 79 reproduces the data MK of the master key and its error correcting code from the amplitude of the reproduced signal RF. Specifically, as shown in FIG. 13, the master key detecting circuit 79 detects a pit in a period equal to or greater than a period 6T (a pit in a period from 6T to 11T) in a pit detecting circuit 81. The pit in a period equal to or greater than the period 6T is a pit in which the light amount of the laser at an exposing time of the disk original board is correctly reflected in the reproduced signal. This pit is judged by an MTF (Modulation Transfer Function) in a reproducing optical system.

The pit detecting circuit 81 inputs the binary signal S7 to latch circuits 80A to 80J at ten stages connected in series, and sequentially transfers this binary signal by the reproduced clock CK. A predetermined input terminal of each of the AND circuits is set to an inverting input terminal. Latch outputs of the latch circuits 80A to 80J are input to the AND circuits. When the latch outputs of the latch circuits 80A to 80J are set to value 1 or 0 in accordance with the pits of periods 6T, 7T, 8T, . . . , each of the AND circuits rises the logic level of an output signal. An OR circuit 83 receives the output signal of each of the AND circuits 82A to 82F and outputs its logical OR signal. Thus, the pit detecting circuit 81 detects the pit in a period from 6T to 11T.

The master key detecting circuit 79 shown in FIG. 12 is formed of an analog/digital (A/D) converting circuit 85 for carrying out analog/digital converting processing of the reproduction signal RF to output a digital reproduction signal DRF, a delay circuit 86 for delaying a digital reproduction signal DRF output from the A/D converter 85, and a pit detecting circuit 81.

A latch circuit 87 latches the digital reproduced signal DRF on the basis of the detecting results of the pit detecting circuit 81. Thus, with respect to a pit in a period equal to or greater than 6T, the latch circuit detects the amplitude of the reproduced signal RF at timing for obtaining a return light approximately from a center of the pit. A digital/analog converting circuit 88 performs digital/analog converting processing of the digital reproduced signal DRF. A PE demodulating circuit 89 sets an output signal of the digital/analog converting circuit 88 to be two-valued and generates a binary signal, and detects a clock from this binary signal. Further, the PE demodulating circuit 89 demodulates data of the original master key KM and the error correcting code by processing the binary signal with this clock as a reference. The PE demodulating circuit 89 performs error correcting processing on the regenerated data of the master key KM and outputs the processed data.

As shown in FIG. 12, the master key detecting circuit 79 reproduces the data of the master key KM repeatedly recorded in a read-in area and outputs the regenerated data to a decoder 91 at a regenerating starting time of the optical disk H.

The decoder 91 descramble-processes the reproduced data output from the ECC decoder 77 in a user area with the data of this master key KM as a reference. Thus, the decoder decodes the enciphered reproduced data. Subsequently, a decoder 92 decodes output data of the decoder 91 in accordance with the format of an MPEG and outputs the decoded data.

In the above construction, a value of the correcting value table 54 in the edge position correcting circuits 42A and 42B is set to an initial value in the optical disk recording apparatus 30. The disk original 31 for evaluation is made in the same condition as the making condition of a conventional optical disk. The optical disk 63 for evaluation is made of this disk original 31.

In this optical disk 63 for evaluation, the laser beam L is on-off-controlled by a modulating signal having a signal level changed in a period integer times the basic period T so that the disk original 31 is sequentially exposed. Thus, the input data D1 is recorded on the optical disk by a pit length and a pit interval. In the read-in area, the light amount of the laser beam L is reduced on the basis of data of the master key KM so that the master key KM is recorded by the changing of a pit width. Further, the pit length is changed and formed as the pit width is changed.

Thus, with respect to the reproduced signal obtained from this optical disk 63 for evaluation, jitters are observed by the interference between codes of adjacent pits in a portion in which a pit is formed by a constant light amount. In a changing portion of the pit width, a large jitter is caused by changing the pit length in addition to the interference between the codes of adjacent pits. Further, the amplitude of the reproduced signal is greatly changed in this changing portion of the pit width and also asymmetry is severely changed.

Accordingly, with respect to the reproduced signal obtained from this optical disk 63, the timing crossing the slice level is changed in accordance with a changing pattern of the modulating signal corresponding to the shapes of front and rear pits and lands, and the light amount of the laser beam at an exposing time. Accordingly, a large jitter is caused with respect to a reproduced clock generated from this reproduced signal.

A reproduced signal RF reproduced from this optical disk 63 by the reproducing apparatus 64 is converted to a digital signal by the digital oscilloscope 66. Thereafter, a binary signal, a decoded signal and a reproduced clock are generated by the computer 65. Further, with respect to the optical disk 63, the changing pattern of the modulating signal is detected by detecting the front and rear pits and lands from the decoded signal at every edge of the binary signal. A jitter amount of each edge with respect to the reproduced clock is time-measured at every changing pattern.

Further, when the light amount of the laser beam is reduced and is held at a constant value, these time-measured results are averaged at every changing pattern and the jitter amount caused by each light amount of the laser beam is detected at every changing pattern together with a jitter amount caused by the interference between codes. With respect to the optical disk 63, the arithmetic processing of the equation (1) is executed by the jitter amount detected in this way with the difference τ in delay time between taps of the delay circuit 56 shown in FIG. 7 as a reference. Further, a tap position of the delay circuit 56 capable of canceling this detected jitter amount is detected with a center tap of the delay circuit 56 as a reference. Further, with respect to the optical disk 63, data for specifying this detected tap position is stored in a read only memory as correcting value data DF. Thus, the difference τ in delay time between taps of the delay circuit 56 is set to a jitter correcting unit and the correcting value table 54 is formed.

The correcting value data DF corresponding to a light amount of the laser beam at a high light intensity level is recorded in the correcting value table 54 of the edge position correcting circuit 42A. Further, the correcting value data DF corresponding to a light amount of the laser beam at a low light intensity level is recorded to the correcting value table 54 of the edge position correcting circuit 42B.

When the correcting value table 54 is formed in this way, data of TOC, etc. recorded in the read-in area are input to the modulating circuit 41 in the optical disk recording apparatus 30 and predetermined processing of the data is performed by this modulating circuit 41. The processed data is converted to the modulating signal S2 having a signal level changed with the basic period T as a unit. The signal level of this modulating signal S2 is converted to a TTL level in the edge position correcting circuit 42A shown in FIG. 5, and a clock CK is then reproduced by the PLL circuit 52. Further, in each of the rising edge correcting circuit 50A and the falling edge correcting circuit 50B shown in FIG. 7, the latch circuits 53A to 53M at thirteen stages sequentially perform a latching operation and the changing pattern is detected.

Further, the modulating signal S2 is input from an intermediate latch circuit 53G among these latch circuits 53A to 53M to the monostable multivibrator 55. An output of the monostable multivibrator 55 is triggered at the timing of a rising edge in the rising edge correcting circuit 50A and is also triggered in the timing of a falling edge in the falling edge correcting circuit 50B. These correcting circuits generate a rising pulse signal and a falling pulse signal having signal levels respectively rising in the timings of the rising and falling edges.

The rising pulse signal and the falling pulse signal are sequentially delayed with the delay time τ used to calculate the correcting value data DF as a unit in the delay circuit 56 of each of the rising edge correcting circuit 50A and the falling edge correcting circuit 50B. A tap output of this delay circuit 56 is output to the selector 57. In contrast to this, in the changing pattern of the modulating signal S2 detected by the latch circuits 53A to 53M, corresponding correcting value data DF is detected by getting access to the correcting value table 54 with a latch output of each of the latch circuits 53A to 53M as an address. Contacts of the selector 57 are switched by the correcting value data DF.

The selector 57 of each of the rising edge correcting circuit 50A and the falling edge correcting circuit 50B outputs each of a rising edge signal SS and a falling edge signal SR by respectively correcting the timings of the rising and falling edges of the modulating signal S2 so as to correct a jitter caused when the laser beam L detected by the optical disk 63 for evaluation is irradiated at a high light intensity level. This rising edge signal SS and this falling edge signal SR are synthesized by the flip flop 59. Further, the signal level of an output signal S5 of this flip flop 59 is corrected by the level inverse converting circuit 60. Thus, a modulating signal S1A is generated by correcting the timing of an edge of the modulating signal S2 so as to correct the jitter caused when the laser beam L detected by the optical disk 63 for evaluation is irradiated at a high light intensity level, i.e., so as to reduce the interference between codes.

Similarly, with respect to the modulating signal S2, the changing pattern is detected in the edge position correcting circuit 42B. The rising edge signal SS and the falling edge signal SR are generated by the correcting value data DF corresponding to this changing pattern and they are synthesized by the flip flop 59. Thus, with respect to the modulating signal S2, the edge position correcting circuit 42B generates a modulating signal S1B by correcting the timing of the edge of the modulating signal S2 so as to correct a jitter caused when the laser beam L detected by the optical disk 63 for evaluation is irradiated at a low light intensity level, namely, so as to cancel a change in pit length caused by falling of the light amount of the laser beam and reduce the interference between codes.

In the optical disk recording apparatus 30, data of the master key KM for encipherment is input from a predetermined controller to the CRC circuit 43 upon processing of this read-in area. In this CRC circuit, an error correcting code is added to the data of the master key KM. Further, the data of the master key KM and the error correcting code are converted to a series of serial data in the PE modulating circuit 44 and are then PR-modulated and the modulating data D3 is input to the level switching circuit 45.

Further, the level of a control signal SC1 is switched in accordance with the modulating data D3 by the level switching circuit 45 so that the light amount of the laser beam L is switched from a high light intensity level to a low light intensity level in accordance with the modulating data D3. Thus, exposure is performed in the disk original board 31 such that a pit width is changed in accordance with the data of the master key KM in an area corresponding to the read-in area of the optical disk.

In a period for setting the light amount of the laser beam L to the low light intensity level in the optical disk recording apparatus 30, the data selector 46 selects the modulating signal S1B output from the edge position correcting circuit 42B. In a period except for this period, the modulating signal S1A output from the edge position correcting circuit 42A is selectively output.

The exposure is performed in the disk original board 31 such that the pit width is changed in accordance with the data of the master key KM in an area corresponding to the read-in area of the optical disk. Further, exposure timing is corrected such that a change in pit length caused by changing this pit width is prevented. The exposure timing is also corrected such that the interference between codes caused by adjacent pits is reduced.

When the read-in area is exposed to light, a user area is subsequently exposed in the disk original board 31. At this time, in the optical disk recording apparatus 30, video data D1 provided by the MPEG is sequentially input to the decoder 40. The input data D1 is scramble-processed by the data of the master key KM in the decoder 40 and is enciphered and is subsequently converted to a modulating signal S2 by the modulating circuit 41. Similar to a case in which TOC data, etc. are recorded in the read-in area, modulating the signals S1A and S1B are generated by correcting the timing of an edge of this modulating signal S2.

Further, the modulating signal S1A is selected by the data selector 46 in a state in which the light amount of the laser beam L is held at a high light intensity level by the level switching circuit 45. The input data D1 is recorded in the disk original 31 by sequentially exposing the disk original 31 by this modulating signal S1A (S1). Thus, in the optical disk recording apparatus 30, the data D1 enciphered with the master key KM as a reference is recorded by correcting the pit length so as to reduce the interference between codes caused by adjacent pits at a constant pit width.

An optical disk is produced from the disk original board 31 exposed in this way so that this optical disk H is reproduced by the reproducing apparatus 70 shown in FIG. 12. The video data D1 enciphered by the master key KM is recorded in the user area HV in the optical disk H and the data of this master key KM is recorded in the read-in area HR. Further, the positions of front and rear edges are corrected in accordance with a combining pattern with the adjacent pits so as to reduce the interference between codes from the adjacent pits, and this data is recorded by a pit length and a pit interval. Further, with respect to the master key KM, in a pit in which a recording operation is performed in the read-in area HR by changing the pit width and this pit width is switched, the positions of the front and rear edges are corrected such that a change in the pit length caused by changing the pit width is canceled.

When an optical disk is copied by physically transferring a pit shape from such an optical disk, no physical change in the pit shape can be avoided so that it is difficult to accurately reproduce such a corrected edge position and the change in the pit width. Thus, it is difficult to reproduce the optical disk of this kind by making a copy in the reproducing apparatus.

When the optical disk H is loaded on the reproducing apparatus 70, the optical pickup P is moved to an innermost circumference of the optical disk H and detects a reproduced signal RF having a signal level changed in accordance with the light amount of the return light from the read-in area HR of the optical disk H.

This reproduced signal RF is sliced at a predetermined slice level by the binary circuit 72 and is converted to the binary signal S7. Further, the reproduced clock CK is generated from this binary signal S7 in the PLL circuit 73. In the demodulating circuit 74, the binary signal S7 is sequentially latched by this reproduced clock CK and reproduced data is generated. Further, after the reproduced data is demodulated in the demodulating circuit 74, deinterleave-processing and error correcting processing of the reproduced data are subsequently performed in the ECC decoder 77.

Figure 14:
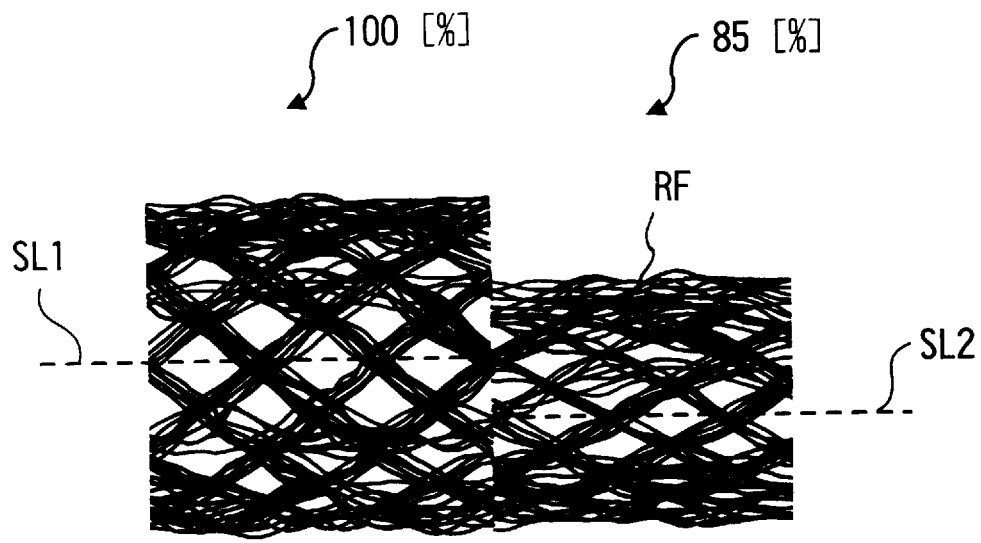
FIG. 14 is a waveform diagram showing a slice level used for binarizing an RF signal when an illegal copy is carried out.

As shown in FIG. 14, when the optical disk having a pit width changed by simply switching the light amount is reproduced in this series of processing, slice levels SL1 and SL2 for setting the reproduced signal RF to be binarized so as to change the signal level at the timing corresponding to the basic period T are changed in accordance with the light amount at an exposing time.

Figure 15:
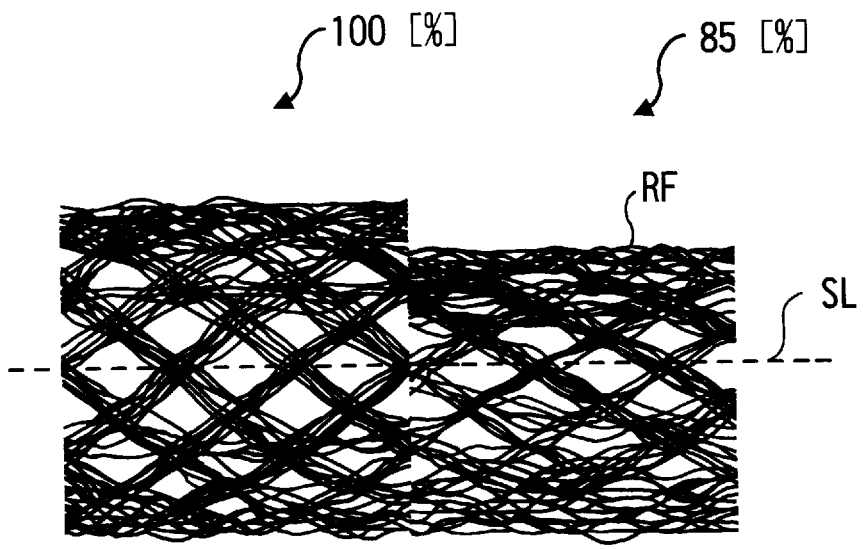
FIG. 15 is a waveform diagram showing a slice level used for binarizing an RF signal when an optical disk recorded by the optical disk recording apparatus 30 according to the present invention is reproduced by a reproducing apparatus according to the present invention.

However, the positions of the front and rear edges are corrected in the optical disk H according to the present invention so as to cancel the change in the pit length caused by changing the pit width. Accordingly, as shown in FIG. 15, a binary signal can be generated in a correct timing by setting the reproduced signal RF to be two-valued at a constant slice level SL. The binary signal can be generated by using a single slice level such that jitters of the reproduced clock CK caused by switching the light amount can be effectively avoided. Further, jitters caused by the interference between codes can be also reduced since the edge positions are corrected so as to reduce this interference between codes.

In FIG. 14, when the reproduced signal from a pit formed by a light amount of 85 [%] is sliced at the slice level SL1 with respect to a pit formed by a light amount of 100 [%] and the amplitude of the reproduced signal is small as in the reproduced signal in e.g., a period 3T, the signal level of the binary signal itself does not cross the slice level so that the jitters are increased, and also it should be understood that a bit error is caused in reproduced data generated from this binary signal.

In the case of a copy, it is difficult to accurately reproduce the corrected edge positions and the change in the pit width. Accordingly, the signal level of the binary signal S7 is not changed at the correct timing so that jitters are correspondingly caused in the reproduced clock CK. Further, a bit error difficult to be corrected is caused in the reproduced data. Thus, in the reproducing apparatus 70, it is difficult to regenerate the optical disk of this kind by making a copy.

The binary signal S7 generated in this way is input to the master key detecting circuit 79 together with the reproduced signal RF and the reproduced clock CK. Here, the master key KM recorded by the change in the pit width is reproduced. Namely, in the master key detecting circuit 79, the binary signal S7 is sequentially latched by the reproduced clock CK and ten signal levels of the binary signal S7 are detected, and a pit in a period equal to or greater than 6T is detected by a logic calculation of these ten samples in the AND circuits 82A to 82F.

Further, after the signal level of the reproduced signal RF is detected by the latch circuit 87 at the timing of the detected pit in a period equal to or greater than 6T, the data of the master key KM is demodulated by processing the detected signal level in the PE demodulating circuit 89. Thus, in the reproducing apparatus 70, the reproduced data output from the ECC decoder 77 is sequentially descramble-processed by the regenerated data of the master key KM in the decoder 91 so that the original data D1 is demodulated.

At this time, since it is difficult to control the pit width with respect to the copied optical disk made by recording the data D1 reproduced in this way, it is difficult to reproduce the data of the master key KM. Accordingly, it is possible to make such a copy difficult to be reproduced. When the master key KM is analyzed and a copied optical disk unrecording the master key KM is set to be recordable, the copied optical disk can be excluded by changing this master key KM in accordance with necessity.

In accordance with the above construction, it is possible to make an illegal copy difficult to be reproduced on a reproducing apparatus side since the input data D1 composed of the main data is enciphered by the master key KM and is recorded by a pit length and a pit interval and this master key is recorded by a pit width. Thus, the illegal copy of this kind can be excluded.

At this time, an edge of each pit is corrected such that the change in the pit length caused in accordance with the pit width is corrected and further the interference between codes caused by adjacent pits is reduced. Accordingly, even when desirable data is recorded at high density, this data can be reliably reproduced. Further, it is possible to make an illegal copy difficult to be reproduced on the reproducing apparatus side. Thus, the illegal copy of this kind can be excluded.

Further, with respect to a pit in a period equal to or greater than 6T, the change in the pit width is reliably detected by selectively detecting the signal level of the reproduced signal caused by the change in the pit width. Accordingly, the master key recorded by the pit width can be reliably regenerated.

(2) Second embodiment

Figure 1:
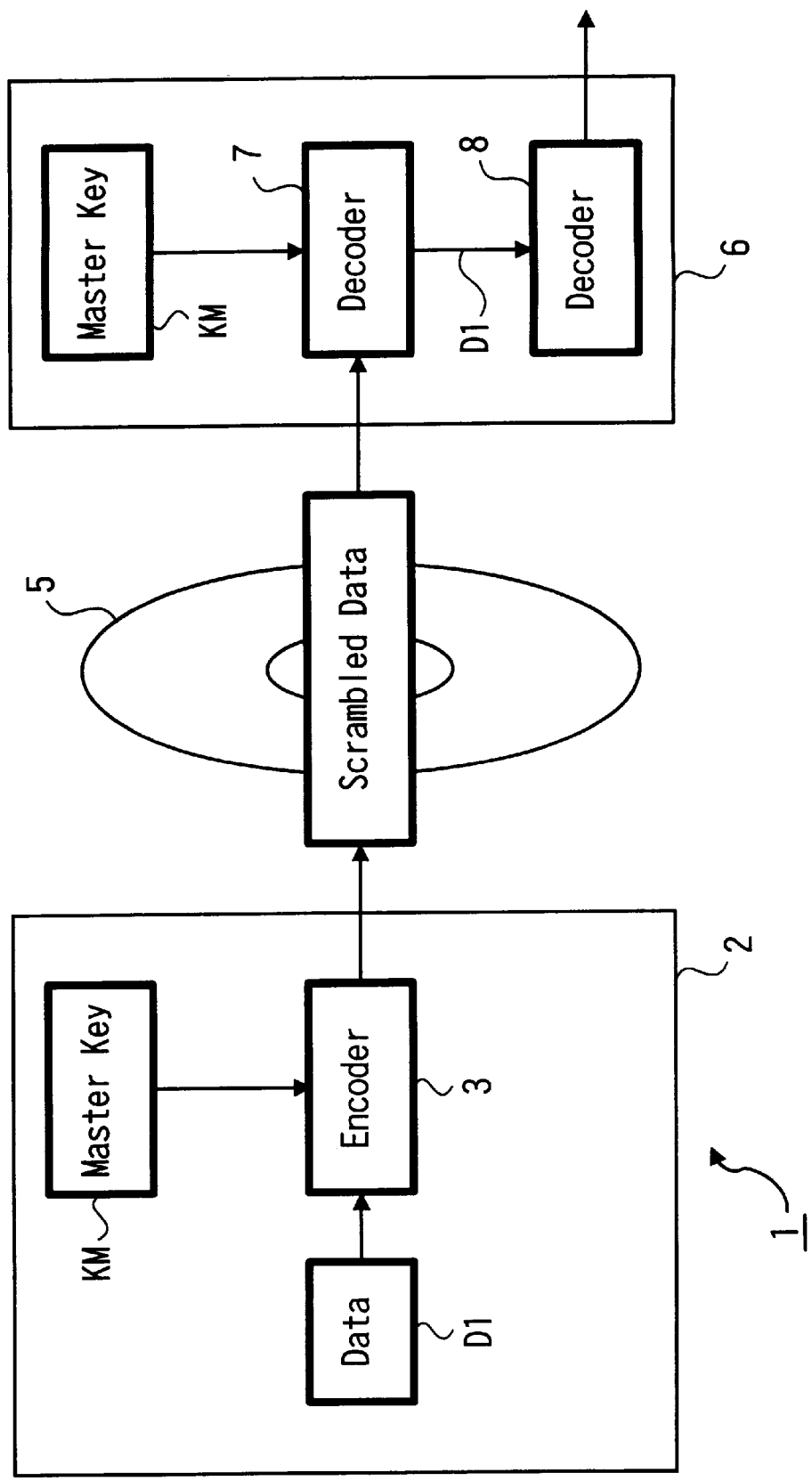
FIG. 1 is a block diagram showing a conventional copy preventing system.
Figure 2:
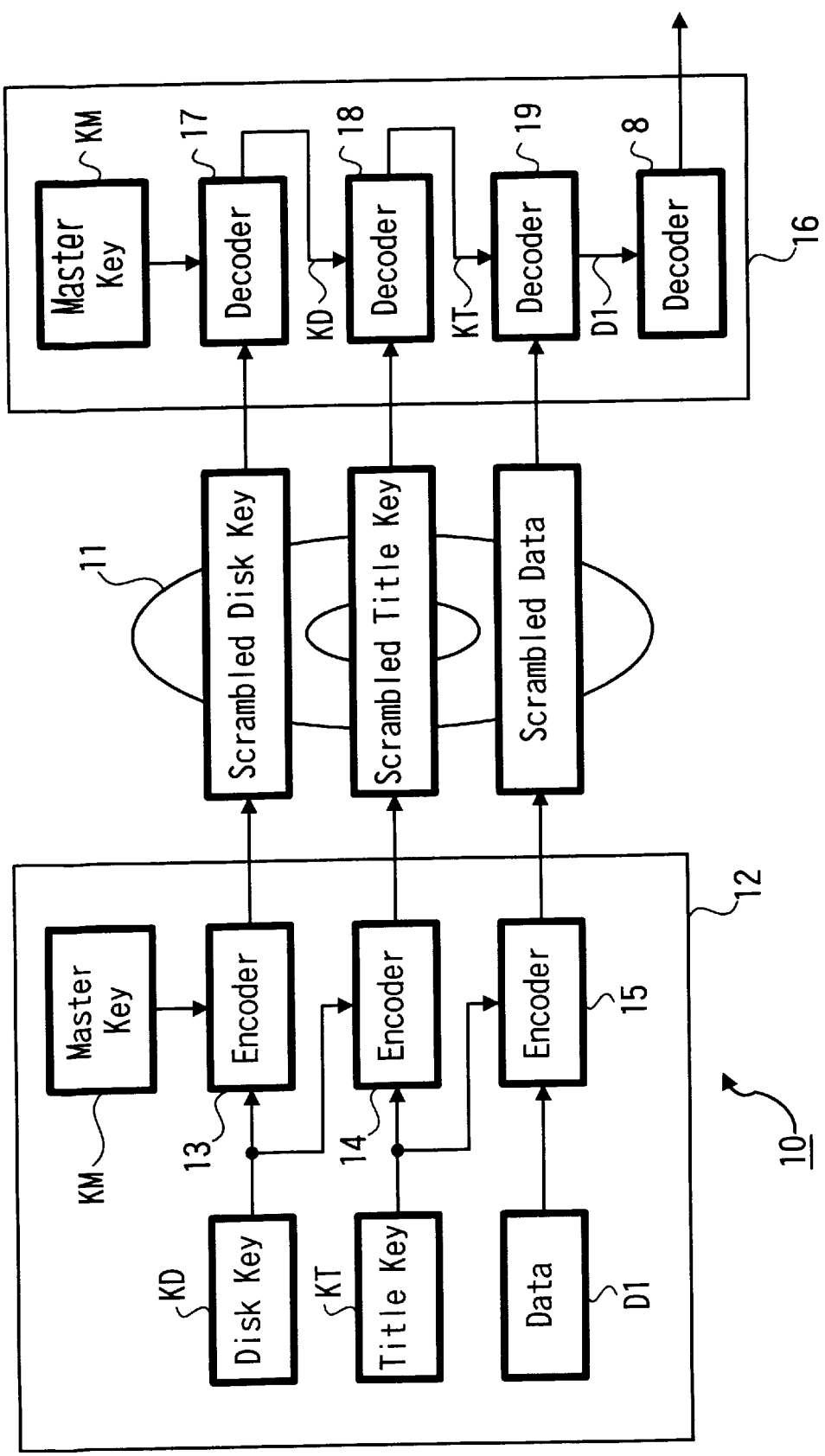
FIG. 2 is a block diagram showing another conventional copy preventing system.
Figure 16:
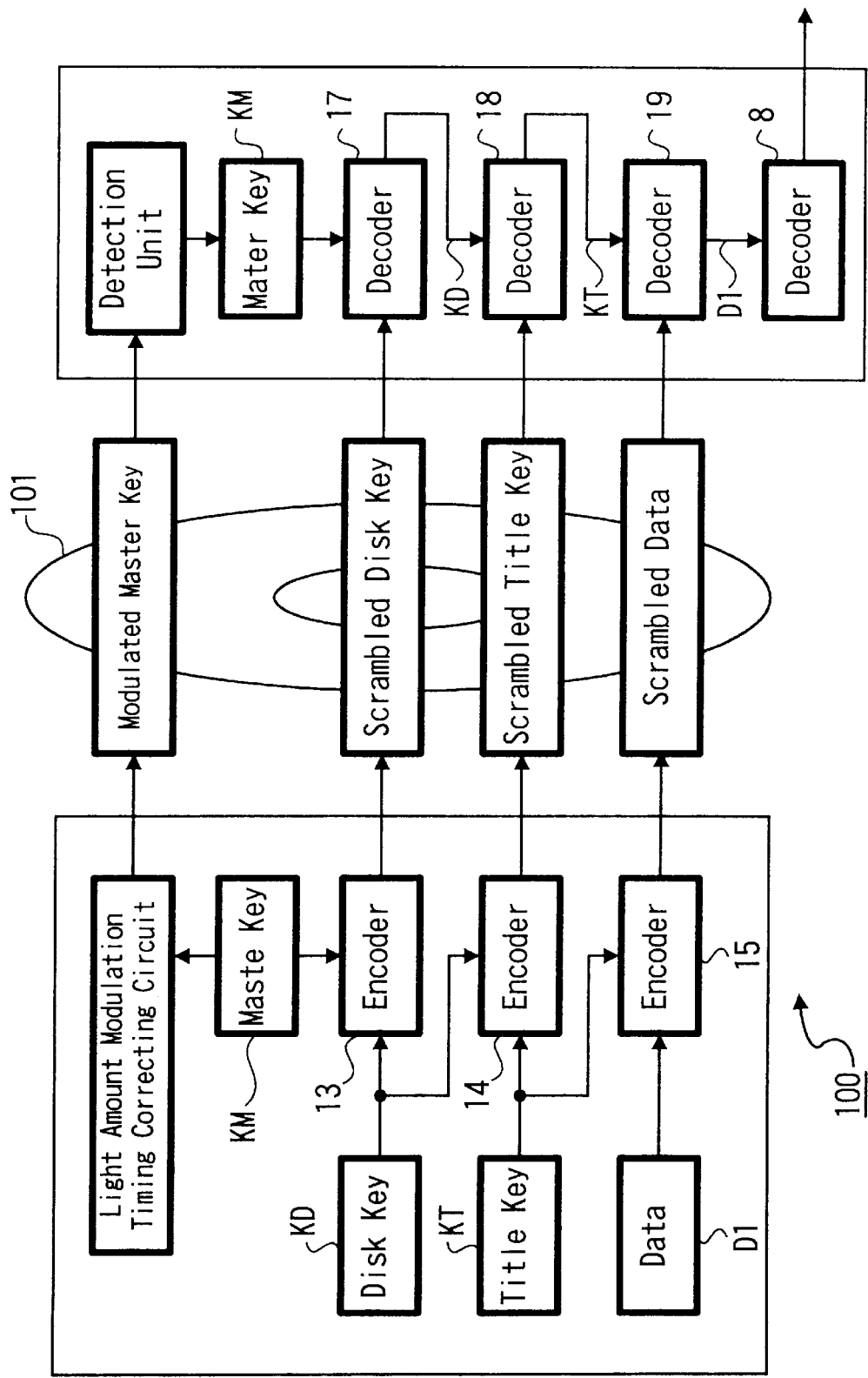
FIG. 16 is a block diagram showing a copy preventing system according to a second embodiment of the present invention.

FIG. 16 is a block diagram showing an information transmitting path 100 in accordance with a second embodiment of the present invention in comparison with FIG. 2. In this embodiment, a disk key KD and a title key KT are hierarchically enciphered by a master key KM and are recorded on an optical disk 101. Further, similar to the first embodiment, the master key KM is recorded.

In accordance with the construction shown in FIG. 16, the disk key KD and the title key KT are hierarchically enciphered by the master key KM and are recorded on the optical disk 101. Further, similar to the first embodiment, the master key KM is recorded. Accordingly, in addition to the effects of the first embodiment, an illegal copy can be excluded in consideration of the stands of a disk manufacturer and a maker of a literary work.

(3) Third embodiment

Figure 17:
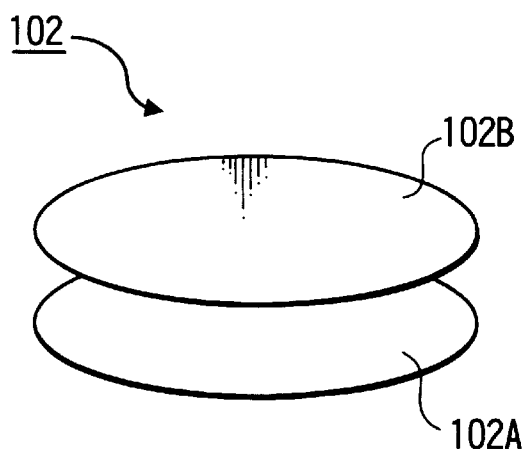
FIG. 17 is a schematic diagram showing an optical disk to which a third embodiment of the present invention is applied.
Figure 18:
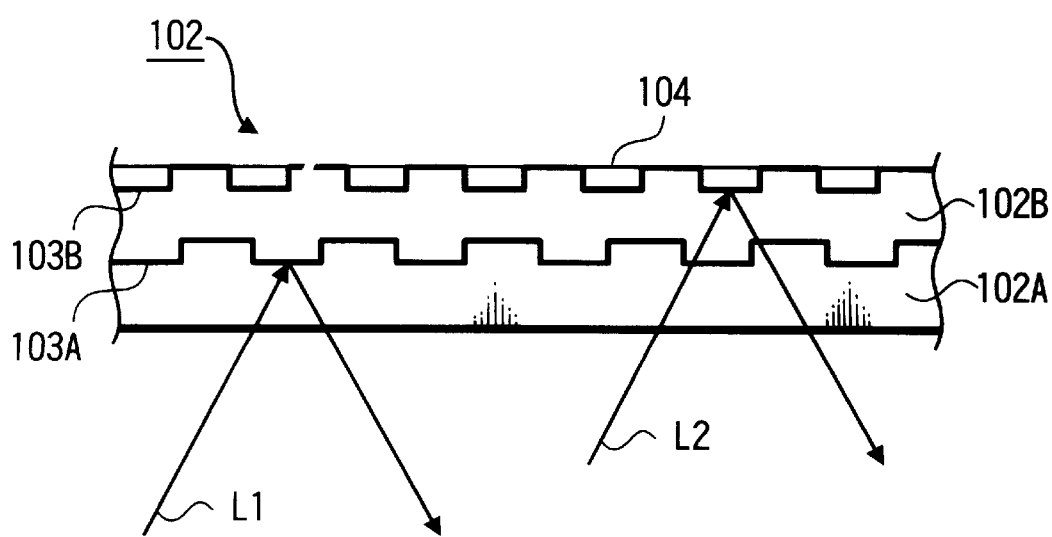
FIG. 18 is a cross-sectional view of the optical disk shown in FIG. 17.

FIG. 17 is an exploded perspective view showing an optical disk 102 in accordance with a third embodiment. As shown in FIG. 18, this optical disk 102 is formed as follows. Namely, predetermined reflecting films 103A and 103B are formed on disk substrates 102A and 102B. Thereafter, the disk substrates 102A and 102B are laminated and a protecting film 104 is attached thereto.

When the protecting film 104 is taken as an upper layer side of the optical disk 102, the reflecting film 103A attached to the disk substrate 102A as a lower layer is formed by a reflecting film having a wavelength selecting property. Namely, this reflecting film 103A shows high reflectivity with respect to a laser beam L1 of 650 [nm] in wavelength with an information recording face of this reflecting film 103 A as a processed object, and shows a light transmitting property with respect to a laser beam L2 of 780 [nm] in wavelength with an information recording face of this reflecting film 103B of the upper layer as a processed object.

The optical disk 102 is set such that the laser beams L1 and L2 of 650 [nm] and 780 [nm] in wavelength are respectively irradiated from the side of the disk substrate 102A as a lower layer and a return light can be received from each of the reflecting films 103A and 103B. Thus, the laser beam L2 of 780 [nm] in wavelength with this reflecting film 103B of the upper layer as an object has the same wavelength as the reproducing apparatus 70 of the optical disk H in accordance with the first embodiment.

A thickness of each of the disk substrates 102A and 102B is set to ½ in comparison with a general optical disk by injection-molding transparent resin such as polycarbonate, etc. Similar to the case of the optical disk in accordance with the first embodiment, a stamper used in this injection-molding is set such that desirable key data is recorded by changing a pit width and an edge of each pit is corrected and formed.

Video data formed by the MPEG in the same format as the above first embodiment is enciphered by the master key KM and are recorded together with this master key KM so that the disk substrate 102B on an upper layer side is formed. Thus, the optical disk 102 is set so that the video data recorded on the disk substrate 102B on the upper layer side can be reproduced by the above reproducing apparatus 70 and this optical disk has a compatibility with the above optical disk H.

Figure 19:
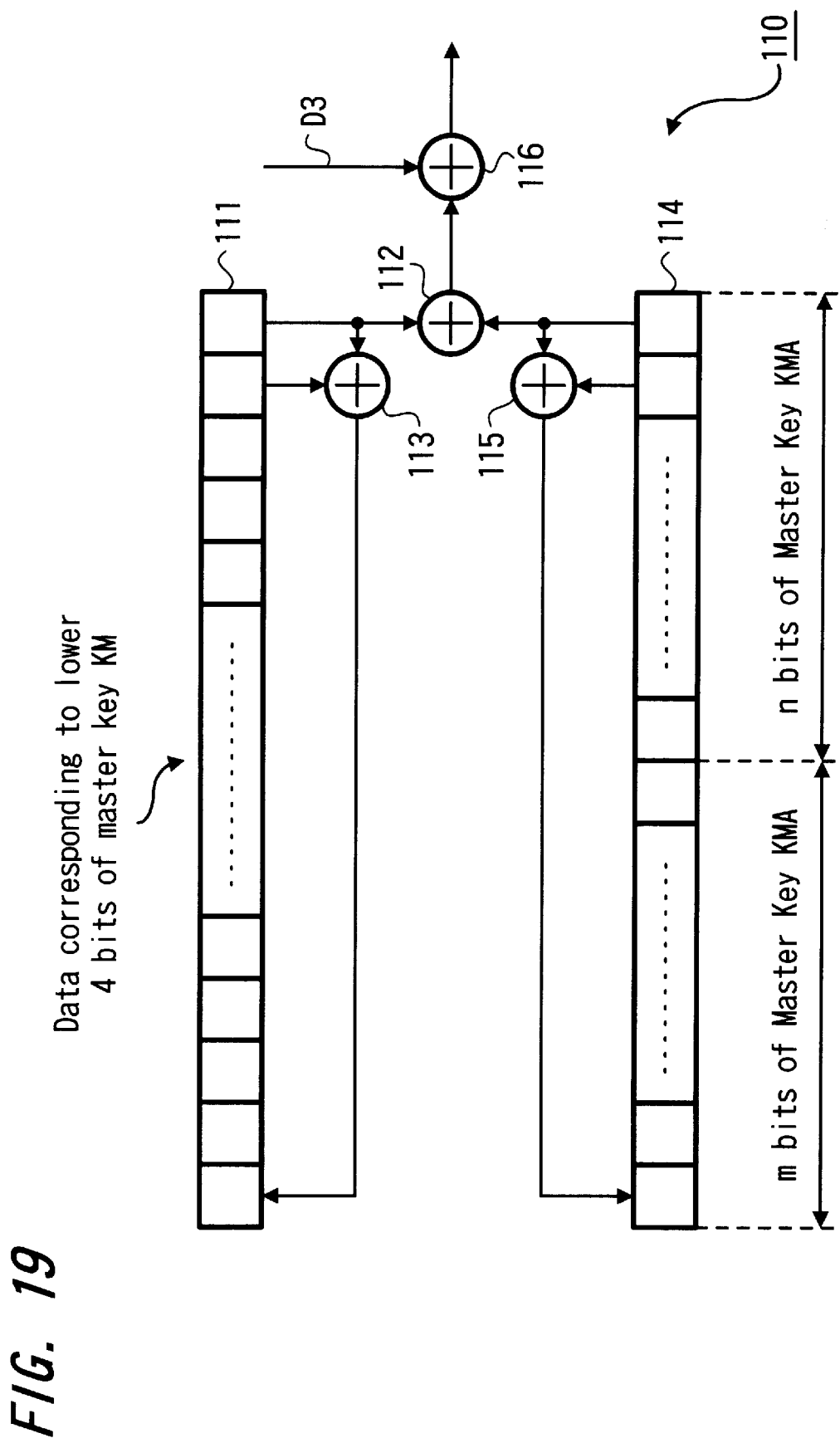
FIG. 19 is a block diagram showing an encoder to which the second embodiment of the present invention is applied.

In contrast to this, with respect to the disk substrate 102A on the lower side, a video signal prior to coding of the video data recorded on this disk substrate 102B on the upper side is coded by coding processing providing a high image quality in comparison with the side of the disk substrate 102B so that the obtained video data is recorded at high density in comparison with the side of the disk substrate 102B. Further, at this time, in the disk substrate 102A on the lower side, a second master key KMA instead of the master key KM is recorded in a read-in area by changing a pit width. As shown in FIG. 19, with respect to the master key KM recorded on the disk substrate 102B on the upper layer side, video data D3 is enciphered on the basis of this master key KM and the second master key KMA.

FIG. 19 shows an encoder 110 of the video data D3 and predetermined key data is preset to a shift register 111 at fifteen stages in this encoder 110. Here, with respect to the key data set to this shift register 111, key data selected from a plurality of kinds of key data set in advance is allocated in accordance with data of the lower four bits of the master key KM. The shift register 111 sequentially transfers the key data in synchronization with a bit clock of the video data D3, and outputs the key data to an adding circuit 112 constructed by an exclusive-OR circuit from the final stage of the shift register 111. The output at this final stage and a register output subsequent to this final stage are output to an adding circuit 113 constructed by an exclusive-OR circuit. An output of this adding circuit 113 is input to a register at a leading stage of the shift register. Thus, while the key data as a preset value is forward changed in the shift register 111, the key data is output to the adding circuit 112. With respect to the plurality of kinds of key data set in advance, data values are set such that no data values are converged to a constant value even when the data values are cyclically added to each other.

In contrast to this, a shift register 114 is formed by connecting registers at r-stages in series to each other, and sequentially transfers data held in synchronization with the bit clock of the video data D3. The shift register outputs the data to the adding circuit 112 constructed by an exclusive-OR circuit from a final stage of this shift register. The output at this final stage and a register output subsequent to this final stage are output to an adding circuit 115 constructed by an exclusive-OR circuit. An output of this adding circuit 115 is input to a register at a leading stage of the shift register. Thus, while preset data is forward changed in the shift register 111, the preset data is output to the adding circuit 112.

Further, in the shift register 114, data of m-bits of the master key KM is set as a preset value to registers at m-stages among the registers at the r-stages. n-bits of the second master key KMA are set to the remaining n-registers as a preset value. Thus, this optical disk 102 is set such that no key data for cryptanalysis can be detected in a construction in which the reflecting film 103A is simply formed on the disk substrate 102A of the lower layer.

Thus, the adding circuit 112 adds output data of the shift registers 111 and 114 to each other and subsequently outputs adding results to an adding circuit 116. The adding circuit 116 is constructed by an exclusive-OR circuit and is input with the video data D3 in a serial data form and then adds the input video data to output data of the adding circuit 112 and outputs the added data. The encoder 110 converts the output data to parallel data and outputs the converted output data. In the optical disk 102, the output data is interleave-processed together with an error correcting code and is then converted to a modulating signal so that a pit is sequentially formed.

In contrast to this, when the optical disk 102 is loaded on a dedicated reproducing apparatus for this optical disk 102, laser beams corresponding to the reflecting films 103A and 103B are respectively irradiated and the stored master keys KM, KMA are reproduced by a change in pit width from return lights of these laser beams. Further, key data designated by the lower four bits of the master key KM and key data provided by m-bits of the master key KM and n-bits of the master key KMA are set to a decoder having the same construction as the encoder of FIG. 17 by the reproduced master keys KM and KMA.

Further, in the user area, a reproduced signal is obtained by receiving the return light from the reflecting film 103A, and reproduced data is generated by processing this reproduced signal. Further, after the reproduced data is deinterleaved and error-correcting, encipherment is released by the decoder.

In accordance with this construction in the third embodiment, video material can be provided by an optical disk of one kind in a different format. At this time, when a copy is made by a single disk substrate with respect to the disk substrate 102A recording the video material therein by the coding processing of a high image quality, this copy can be effectively excluded.

While in the third embodiment MPEG-formatted video data is recorded, the present invention is not limited thereto. A digital audio signal quantized with a sampling frequency of 44.1 kHz and 16 bits may be recorded on the disk substrate 102A, and a one-bit digital audio signal quantized with a sampling frequency of 2.8 MHz which is sixteen times as high as 44.1 kHz may be recorded on the disk substrate 102B.

While in the above third embodiment respective information recorded on the reflective films 103A and 103B of the optical disk are encrypted by using the master keys KM, KMA, it is needless to say that contents recorded on the reflective film 103B by using the master key recorded on the reflective film 103A are encrypted or that contents recorded on the reflective film 103A are encrypted by using the master key recorded on the reflective film 103B.

(4) other embodiment

The above-mentioned embodiments relate to a case in which one master key is recorded by a pit width with respect to each disk substrate. However, the present invention is not limited to this case, but a plurality of kinds of key data may be recorded and selectively used. In this case, the plurality of key data may be distributed to a disk key, a title key, etc. Further, various kinds of arithmetic processing of the plurality of key data may be performed on a reproducing apparatus side so that enciphered data with the obtained data as key data can be decoded.

Further, the above embodiments relate to a case in which the key data for decoding a cipher is recorded in the read-in area. However, the present invention is not limited to this case, but the key data may be recorded in the user area, etc.

Further, the above embodiments relate to a case in which the enciphered data is decoded by directly using the key data for decoding the cipher recorded in the read-in area, or referring to the master key recorded to the read-in area. However, the present invention is not limited to this case. For example, the present invention can be also widely applied to a case in which a plurality of kinds of key data recorded by a pit width, or pit length and interval are specified by data recorded by the pit width, etc.

Further, the above embodiments relate to a case in which the pit width is modulated by switching the light amount of the laser beam at two stages. However, the present invention is not limited to this case, but the pit width may be modulated by switching the light amount of the laser beam at many stages when a change in the pit width can be sufficiently discriminated practically.

Further, the above embodiments relate in a case in which the master key is repeatedly recorded to the read-in area by simply changing the pit width. However, the present invention is not limited to this case. For example, the master key, etc. may be recorded by this change in the pit width only to a predetermined area in accordance with an irradiating position of the laser beam. In this case, for example, if the master key, etc. are intermittently recorded by changing the pit width at timing synchronized with rotation of the optical disk, a bar code pattern spreading in a radiating shape can be formed on a reflecting face of the optical disk. Accordingly, it is possible to judge whether it is an illegal copy or not by existence or nonexistence of this pattern. Further, a figure pattern such as a maker name, etc. can be also formed on the reflecting face.

Further, the above embodiments relate to a case in which the key data for decoding the cipher are simply recorded by modulating the pit width. However, the present invention is not limited to this case, but data such as a destination place of the optical disk, etc. unnecessary for a user may be recorded together with the key data.

Further, the above embodiments relate to a case in which the key data required to process video data as enciphered main data is recorded by the pit width. However, the present invention is not limited to this case. For example, various kinds of data required to decode the main data recorded by a pit length and a pit interval can be allocated in subdata recorded by this pit width. For example, data for designating a quantizing table for requantizing the main data may be allocated, and designating data of an error correcting format, etc. can be applied.

Further, the above embodiments relate to a case in which an optical disk is made by directly using a correcting value table made by the optical disk for evaluation. However, the present invention is not limited to this case. For example, the optical disk for evaluation may be remade by using the correcting value table made from the optical disk for evaluation, and the correcting value table may be corrected by this remade optical disk for evaluation. If the correcting value table is repeatedly corrected, jitters can be correspondingly reduced reliably.

Further, the above embodiments relate to a case in which a changing pattern is detected by using thirteen samples of a modulating signal. However, the present invention is not limited to this case, but the number of samples may be increased in accordance with necessity so that it is possible to cope with a long recording information pattern.

Further, the above embodiments relate to a case in which a jitter amount is measured by timing-measuring a binary signal with a basic clock as a reference and correcting value data is generated based on results of this measurement. However, the present invention is not limited to this case. When sufficient practical accuracy can be secured, the correcting value data can be generated by detecting a voltage level of the reproduced signal with the basic clock as a reference instead of the measurement of the jitter amount using this time measurement. In this case, an error voltage is calculated from the detected voltage level of the reproduced signal until a slice level. The correcting value data is calculated by transient responsive characteristics of this error voltage and the reproduced signal.

Further, the above embodiments relate to a case in which a timing of the modulating signal is corrected in accordance with the correcting value data set to a table. However, the present invention is not limited to this case. When sufficient practical accuracy can be secured, the correcting value data is calculated by arithmetic processing instead of the correcting value data detected in advance, and the timing of the modulating signal may be corrected by these calculated correcting value data.

Further, the above embodiments relate to a case in which the correcting value data are calculated by the optical disk for evaluation. However, the present invention is not limited to this case. For example, when the present invention is applied to the optical disk apparatus of a write-once type, the correcting value data may be calculated on the basis of trial written results in a so-called trial writing area.

Further, the above embodiments relate to a case in which the present invention is applied to the optical disk. However, the present invention is not limited to this case. For example, the present invention can be widely applied to an optical disk apparatus for recording various kinds of data by a pit, and an optical disk apparatus for recording various kinds of data by a mark by applying a thermal magnetic recording technique to this optical disk apparatus. By the way, the present invention can be also widely applied to an optical disk apparatus in which various kinds of data are multi-valued and recorded by the difference between transient responsive characteristics of the reproduced signal.

As mentioned above, in accordance with the present invention, reproduced data is obtained by controlling the irradiating timing of a laser beam and a light amount of the laser beam and judging the reproduced signal with a threshold value as a reference. Data required to process the reproduced data is recorded by an amplitude value of the reproduced signal so that an illegal copy can be effectively avoided.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. A recording apparatus for recording a modulated scrambled data signal encrypted with key data on an optical recording medium, comprising:

edge change detecting means for detecting a change pattern of an edge of said modulated scrambled data;

timing correcting means for correcting a timing of an edge rising/falling position of pulses forming said modulated scrambled data signal so that jitter resulting from intersymbol interference upon reproduction is reduced depending upon the change pattern of the edge detected by said edge change detecting means; and light amount controlling means for controlling a light amount of a light beam irradiated on said optical recording medium based on a timing output from said timing correcting means, wherein when said key data used for encrypting main data is recorded on said optical recording medium, said light amount controlling means is controlled in accordance with said key data.

2. The recording apparatus according to claim 1, wherein said edge change detecting means includes rising edge detecting means and falling edge detecting means.

3. The recording apparatus according to claim 2, wherein a bar code pattern radially spread on said optical recording medium is formed by intermittently controlling said light amount controlling means.

4. The recording apparatus according to claim 1, wherein said timing correction means includes storage means for storing a plurality of correction value data, and delay means for setting a delay time for correction of the timing of said modulated scrambled data, wherein one of said plurality of correction value data is output from said storage means to said delay means in response to the change pattern of the edge of said modulated scrambled data, and a timing signal indicative of a delay time corrected in response to said one of said plurality of correction value data is output.

5. The recording apparatus according to claim 1, wherein said optical recording medium is formed of at least a first layer and a second layer, and main data to be recorded on said first layer is encrypted using key data obtained by a calculation of key data recorded on said first layer and key data recorded on said second layer.

6. The recording apparatus according to claim 1, wherein said optical recording medium is formed of at least a first layer and a second layer, said recording apparatus further comprising:

preset key data generator means for generating preset key data based on a part of key data recorded on said first layer;

first random number generator means for generating a first random number based on the preset key data generated by said preset key data generator means;

second random number generator means for generating a second random number based on key data recorded on said first layer and key data recorded on said second layer; and an encoder for encrypting main data recorded on said first layer based on the first random number and said second random number generated by said first random number generator means and said second random number generator means, respectively.

7. The recording apparatus according to claim 1, wherein said key data is used for encrypting a title of main data to be recorded on said optical recording medium.

8. The recording apparatus according to claim 1, wherein said key data is used for encrypting a title of said optical recording medium.

9. A reproducing apparatus for reproducing encrypted data on an optical recording medium, wherein main data is recorded after being encrypted at a first signal level and key data for decrypting said main data is recorded at a second signal level different from said first signal level, comprising:

binarizing means for binarizing a reproduction signal reproduced from said optical recording medium with a slice level;

key detector means for detecting key data from said reproduction signal;

demodulator means for demodulating said reproduction signal binarized by said binarizing means; and decoder means for decrypting said reproduction signal demodulated by said demodulator means using the key data detected by said key detector means.

10. The reproducing apparatus according to claim 9, wherein said key detector means includes convertor means for converting the reproduction signal reproduced from said optical recording medium into a digital signal, pit-length detector means for detecting a pit length from said reproduction signal binarized by said binarizing means, discriminating means for discriminating whether the pit length detected by said pit-length detector means is one of a predetermined pit length and a longer pit length, and reproduction-signal-level detector means for detecting a level of the reproduction signal obtained from a pit determined by said discriminating means as having one of a predetermined pit length and a longer pit length, and wherein key data is detected based on the level of said reproduction signal detected by said reproduction signal-level detector means.

11. The reproducing apparatus according to claim 9, wherein said key data is recorded on a lead-in area of said optical recording medium.

12. The reproducing apparatus according to claim 9, wherein said optical recording medium is formed of at least a first layer and a second layer, and main data to be recorded on said first layer is encrypted using key data obtained by a calculation of key data recorded on said first layer and key data recorded on said second layer.

13. The reproducing apparatus according to claim 9, wherein said key data is used for encrypting a title of main data to be recorded on said optical recording medium.

14. The reproducing apparatus according to claim 9, wherein said key data is used for encrypting a title of said optical recording medium.

15. An optical recording medium recorded with modulated scrambled data encrypted with key data at a reference period in a form of one of a mark and a space, comprising:

encryption data represented by a width of one of said mark and said space; and main data encrypted using said encryption data represented by a length and an interval of one of said mark and said space.

16. The optical recording medium according to claim 15, wherein said encryption data is recorded on a lead-in area of said optical recording medium.

17. The optical recording medium according to claim 15, wherein said encryption data is used for encrypting a title of main data to be recorded on said optical recording medium.

18. The optical recording medium according to claim 15, wherein said encryption data is used for encrypting a title of said optical recording medium.

19. The optical recording medium according to claim 15, wherein said optical recording medium is formed of at least a first layer and a second layer, and main data to be recorded on said first layer is encrypted using encryption data obtained by a calculation of encryption data recorded on said first layer and encryption data recorded on said second layer.

20. The optical recording medium according to claim 15, wherein said optical recording medium is formed of at least a first layer and a second layer, and wherein main data recorded on said first layer is a digital audio signal sampled at 44.1 kHz and multi-bit quantized and main data recorded on said second layer is a digital audio signal sampled at 44.1*n (n being an integer greater than 2) kHz and one-bit quantized.

* * * * *